US010358538B2

(12) United States Patent
Tarumoto et al.

(10) Patent No.: US 10,358,538 B2
(45) Date of Patent: Jul. 23, 2019

(54) FOAMABLE POLYSTYRENE RESIN PARTICLES AND POLYSTYRENE RESIN PREFOAMED PARTICLES

(71) Applicant: SEKISUI PLASTICS CO., LTD., Osaka-shi, Osaka (JP)

(72) Inventors: Hiroyuki Tarumoto, Koga (JP); Ryosuke Chinomi, Koga (JP)

(73) Assignee: SEKISUI PLASTICS CO., LTD., Osaka (JP)

( * ) Notice: Subject to any disclaimer, the term of this patent is extended or adjusted under 35 U.S.C. 154(b) by 0 days.

(21) Appl. No.: 15/617,823

(22) Filed: Jun. 8, 2017

(65) Prior Publication Data

US 2017/0327661 A1 Nov. 16, 2017

Related U.S. Application Data

(63) Continuation-in-part of application No. 15/098,702, filed on Apr. 14, 2016, now abandoned, which is a continuation-in-part of application No. 13/504,072, filed as application No. PCT/JP2010/069053 on Oct. 27, 2010, now abandoned.

(30) Foreign Application Priority Data

| Oct. 27, 2009 | (JP) | 2009-246290 |
| Oct. 27, 2009 | (JP) | 2009-246291 |
| Oct. 27, 2009 | (JP) | 2009-246292 |
| Oct. 27, 2009 | (JP) | 2009-246293 |

(51) Int. Cl.
*C08J 9/16* (2006.01)
*C08J 9/04* (2006.01)
*C08J 9/18* (2006.01)
*C08J 9/14* (2006.01)
*C08J 9/00* (2006.01)
*C08J 9/232* (2006.01)

(52) U.S. Cl.
CPC .............. *C08J 9/18* (2013.01); *C08J 9/0014* (2013.01); *C08J 9/0019* (2013.01); *C08J 9/0023* (2013.01); *C08J 9/0066* (2013.01); *C08J 9/141* (2013.01); *C08J 9/16* (2013.01); *C08J 9/232* (2013.01); *C08J 2201/03* (2013.01); *C08J 2203/14* (2013.01); *C08J 2203/142* (2013.01); *C08J 2325/06* (2013.01)

(58) Field of Classification Search
CPC ... C08J 9/0019; C08J 9/232; C08J 9/16; C08J 2201/03; C08J 2325/04; C08J 2325/06
See application file for complete search history.

(56) References Cited

U.S. PATENT DOCUMENTS

| 6,340,713 B1 | 1/2002 | Glück et al. |
| 2006/0106122 A1 | 5/2006 | Naito et al. |
| 2009/0065960 A1* | 3/2009 | Allmendinger ....... B29C 44/105 264/12 |

FOREIGN PATENT DOCUMENTS

| CN | 1675294 A | 9/2005 |
| CN | 101248120 A | 8/2008 |
| EP | 1 712 586 A1 | 10/2006 |
| JP | 63-172744 A | 7/1988 |
| JP | 7-188458 A | 7/1995 |
| JP | 8-302056 A | 11/1996 |
| JP | 10-17698 A | 1/1998 |
| JP | 11-106548 A | 4/1999 |
| JP | 11-130898 A | 5/1999 |
| JP | 2001-525001 A | 12/2001 |
| JP | 2002-194130 A | 7/2002 |
| JP | 2002-356575 A | 12/2002 |
| JP | 2003-64212 A | 3/2003 |
| JP | 2003-313354 A | 11/2003 |
| JP | 2003-335891 A | 11/2003 |
| JP | 2004-75952 A | 3/2004 |
| JP | 2004-123973 A | 4/2004 |
| JP | 2004-224977 A | 8/2004 |
| JP | 2005-139356 A | 6/2005 |
| JP | 2005-145988 A | 6/2005 |
| JP | 2005-336317 A | 12/2005 |
| JP | 2006-316251 A | 11/2006 |
| JP | 2007-9018 A | 1/2007 |

(Continued)

OTHER PUBLICATIONS

International Search Report for Application No. PCT/JP2010/069053 dated Jan. 25, 2011.
Taiwanese Office Action for the Application No. 099136662 dated Apr. 22, 2013.
Supplementary European Search Report for the Application No. EP 10 82 6763 dated Apr. 22, 2014.
Notification of Reasons for Refusal for Application No. 2009-246292 from Japan Patent Office dated Mar. 4, 2014.
Notification (Information Statement) for the Application No. 2009-246290 from Japan Patent Office dated Jul. 1, 2014.
Notification (Information Statement) for the Application No. 2009-246291 from Japan Patent Office dated Jul. 8, 2014.
Notification (Information Statement) for the Application No. 2009-246292 from Japan Patent Office dated Jul. 8, 2014.

(Continued)

*Primary Examiner* — Kara B Boyle
(74) *Attorney, Agent, or Firm* — Wenderoth, Lind & Ponack, L.L.P.

(57) ABSTRACT

In foamable polystyrene resin particles that are obtained by granulating a polystyrene resin containing a flame retardant and a foaming agent, the flame retardant has a bromine atom in a molecule, contains less than 70% by mass of bromine, has a benzene ring in a molecule, and has a 5% by mass decomposition temperature in a range of from 200° C. to 300° C. the flame retardant is the sole source of bromine in the foamable polystyrene resin particles, a ratio (B:A) between (A) a by mass of the flame retardant contained in the total foamable polystyrene resin particles and (B) a % by mass of the flame retardant contained in the surface of the resin particles is in a range of from 0.8:1 to 1.2:1, and the amount of the flame retardant added is in a range of from 0.5% by mass to 5.0% by mass, based on 100 parts by mass of the resin fraction in the foamable polystyrene resin particles.

15 Claims, 1 Drawing Sheet

(56) References Cited

FOREIGN PATENT DOCUMENTS

| | | |
|---|---|---|
| JP | 2007-169408 A | 7/2007 |
| JP | 2007-211177 A | 8/2007 |
| JP | 2007-238927 A | 9/2007 |
| JP | 2007-238961 A | 9/2007 |
| JP | 2007-246566 A | 9/2007 |
| JP | 2007-262181 A | 10/2007 |
| JP | 4035979 B2 | 1/2008 |
| JP | 2008-291181 A | 12/2008 |
| JP | 2009-138146 A | 6/2009 |
| JP | 2010-275528 A | 12/2010 |
| WO | WO-2010/125894 A1 | 11/2010 |
| WO | WO-2011/052631 A1 | 5/2011 |

OTHER PUBLICATIONS

Notification (Information Statement) for the Application No. 2009-246293 from Japan Patent Office dated Jul. 8, 2014.
Chinese Office Action for Application No. 201080059635.9 dated May 5, 2015.
Ozerov, B.A. et al., "Process for Casting Expanded Polystyrene Pattern", China Machine Press, 1974, p. 23.
The First Office Action for the Application No. 201610046400.5 from the State Intellectual Property Office of the People's Republic of China dated Jan. 18, 2018.

\* cited by examiner

FOAMABLE POLYSTYRENE RESIN PARTICLES AND POLYSTYRENE RESIN PREFOAMED PARTICLES

CROSS-REFERENCE TO RELATED APPLICATIONS

This application is a Continuation-in-Part Application of patent application Ser. No. 15/098,702, filed Apr. 14, 2016, which is a Continuation-in-Part of patent application Ser. No. 13/504,072, filed Apr. 25, 2012, which is a 371 application of Application No. PCT/JP2010/069053, filed on Oct. 27, 2010, which is based on Japanese Application Nos. 2009-246290, 2009-246291, 2009-246292 and 2009-246293 filed on Oct. 27, 2009, the entire contents of which are hereby incorporated by reference.

TECHNICAL FIELD

The present invention relates to a polystyrene resin foam-molded article excellent in environmental compatibility, flame retardancy and heat insulating property, and to foamable polystyrene resin particles used for producing the molded product and a process for production thereof. The polystyrene resin foam -molded article of the present invention is suitably used for a foam-molded article which is required to have flame retardancy and heat insulating property, for example, for bidding materials, members for banking, vehicle interior materials, and the like. This application is a continuation application in part based on U.S. patent application Ser. No. 15/098,702, filed on Apr. 14, 2016, based on U.S. patent application Ser. No. 13/504,072, filed on Apr. 25, 2012.

BACKGROUND ART

The polystyrene resin particles according to the present invention are specifically flame retardant-containing polystyrene resin particles, foamable polystyrene resin particles for producing a heat-insulating material for building materials, foamable polystyrene resin particles for producing a banking member, and foamable polystyrene resin particles for producing a vehicle interior material. Hereinafter, these will be simply referred to by a general term of "foamable polystyrene resin particles" in some cases as necessary.

Hitherto as foamable polystyrene resin particles containing a flame retardant, for example, techniques disclosed in Patent Documents 1 to 3 have been suggested in the related art.

Patent Document 1 (Japanese Patent Application, First Publication No. 63-172744) discloses a process for producing a flame-retarding foamed styrene-based resin, which includes adding an organic solvent solution that contains 1.0 part by mass to 10 parts by mass of a bromine-based flame retardant having a predetermined structure and a foaming agent to 100 parts by mass of a styrene-based resin, and heating and foaming this mixture.

Patent Document 2 (Japanese Patent Application, First Publication No. 11-130898) discloses a process for producing a self-extinguishing polystyrene resin particles, which is characterized by including dispersing tetrabromobisphenol A diallyl ether such that the particle size becomes 50 μm or less in the presence of a surfactant, and then impregnating polystyrene resin particles with this dispersion as well as a softening; agent, a flame-retarding aid, a plasticizer, and a foaming agent. Patent Document 2 also discloses a molded article obtained using the resin particles.

Patent Document 3 (Published Japanese Translation No. 2001-525001 of the PCT International Publication) discloses a particle-like expandable styrene polymer containing evenly distributed graphite powder, and self-extinguishing foam obtained by treating the polymer. Patent Document 3 also discloses that the treatment can produce self-extinguishing foam which contains, as a flame retardant, an organic bromine compound including 70% by mass or more of bromine and passes a combustion test B2 (according to DIN 4102). As the organic bromine compound, hexabromocyclododecane, pentabromomonochlorocyclohexane, and pentabromophenylallyl ether are disclosed.

In addition, an insulation method is known. In this method, in order to improve an insulation performance in houses and the like, heat-insulating materials are installed between joists in a floor or between supporting members such as pillars or said walls. As the heat-insulating materials used for such an insulation method, glass wool has been widely used in general. However, the insulating effect of glass wool easily deteriorates since glass wool is hygroscopic. Accordingly, a high insulating effect over a long time cannot be expected, and there are problems in workability. For these reasons, recently, this type of insulating material has begun to be substituted with a polystyrene resin foam-molded article that is excellent in dimensional stability and a heat-insulating property.

The heat-insulating material for building materials is generally required to have a flame-retarding performance of a certain level or higher, from the viewpoints of preventing fire or the like, preventing spread of tire resulting from flame spreading in tire, and the like. In order to impart a sufficient flame-retarding performance to the polystyrene resin foam-molded article, a flame retardant is used by being added to foamable polystyrene resin particles for producing foamed molded articles.

The insulating material for building materials is required to have a water proofing property, an anti-hygroscopic property, moisture resistance, and a heat-insulating property. Moreover, the insulating material is also required not to expand or contract with temperature change (dimensional stability).

In addition, in order to counteract sick house syndrome that has been an increasing trend in recent years, the insulating material for building materials is required to reduce the amount of volatile organic compounds released. Examples of causative compounds of sick house syndrome include, as volatile organic compounds (VOC) for which the Ministry of Health, Labour and Welfare has established a guideline amount, formaldehyde, acetaldehyde, toluene, xylene, ethylbenzene, styrene, and the like.

Hitherto, as learnable polystyrene resin particles used as insulating materials for building materials, for example, a technique disclosed in Patent Document 4 (Japanese Patent Application, First Publication No. 2003-64212) has been suggested in the related art.

Patent Document 4 discloses foamable polystyrene resin particles which contain, in 100 parts by mass of foamable polystyrene resin particles, 350 ppm to 1200 ppm of a styrene monomer, 0.1 parts by mass to 2 parts by mass of a plasticizer that cannot be distilled at 250° C. or lower when vacuum distillation is performed under a pressure of 6.666× $10^{-4}$ MPa mmHg), and a foaming agent.

Moreover, hitherto, a bank using foamed synthetic resin blocks has been widely used as the bank on weak ground, for slopes, or for an artificial hill in a garden, and used for embedding or backfiliing of an underground structure. As foam used for these members, polystyrene resin foams are used in many cases from the viewpoints of strength, water resistance, and the like. Among these, foamed molded articles are generally used which are produced in an in-mold foam molding method which includes pre-foaming foamable polystyrene resin particles (also referred to as beads) by heating, filling the obtained prefoamed particles in a cavity of a mold, and performing foaming by heating and molding in the mold.

The banking member is generally required to have a flame-retarding performance of a certain level or higher, from the viewpoints of preventing fire or the like, preventing the ground from becoming unstable due to flame spreading, and the like. In order to impart a sufficient flame-retarding performance to the polystyrene resin foam-molded article, a flame retardant is used by being added to the foamable polystyrene resin particles for producing the foamed molded article.

Hitherto, as methods of adding a flame retardant to the polystyrene resin foam-molded article, there have been a method of adding a flame retardant together with a styrene-based monomer during polymerization (for example, see Patent Document 4), and a method of simultaneously adding a flame retardant and a foaming agent when polystyrene resin particles are impregnated with the foaming agent, so as to produce foamable polystyrene resin particles by impregnating the polystyrene resin particles with the flame retardant and the foaming agent (for example, see Patent Documents 5 to 7: Japanese Patent Application, First Publication No. 2003-335891, Japanese Patent Application, First Publication No. 2002-194130, and Japanese Patent No. 4035979).

Moreover, hitherto, as interior materials of various vehicles such as automobiles, synthetic resin products have been widely used. Although non-foamed products are also used as the synthetic resin products, vehicle interior materials formed of synthetic resin foam-molded article are widely used, for the purposes of improving ride comfort by enhancing shock absorbing properties, protecting passengers by absorbing shock, securing flatness in a vehicle, and the like. As such foam-molded articles, various resins such as foamable urethane and foamable polystyrene are used. However, foamable polystyrene resin is widely used since this resin is excellent in moldability and functionality. In addition, examples of vehicle interior materials using the foamable polystyrene resin include automobile interior materials, particularly, a floor spacer, a door pad, a toolbox, and the like.

The vehicle interior material is generally required to have a flame-retarding performance of a certain level or higher, from the viewpoints of preventing tire or the like and a self-extinguishing property. In order to impart a sufficient flame-retarding performance to the polystyrene resin foam-molded article, a flame retardant is used by being added to foamable polystyrene resin particles for producing the foam-molded article.

In addition, in order to counteract the sick house syndrome described above, the vehicle interior materials are strongly required to contain an extremely small amount of volatile organic compounds.

Hitherto, regarding the reduction of the volatile organic compounds in the foamable polystyrene resin, for example, a technique disclosed in Patent Document 8 (Japanese Patent Application, First Publication No. 11-106548) has been suggested, Patent Document 8 discloses styrene-based foamable resin particles which contain 1 ppm to 300 ppm of a residual styrene monomer, 1 ppm or less of benzene, 0.1% by mass to 2% by mass of a plasticizer that is compatible with styrene and has an SP value of 7 to 10, and a foaming agent.

In addition, Patent Document 4 discloses learnable polystyrene resin particles which contain, in 100 parts by mass of the foamable polystyrene resin particles, 350 ppm to 1200 ppm of a styrene monomer, 0.1 parts by mass to 2 parts by mass of a plasticizer that cannot be distilled at 250° C. or lower when vacuum distillation is performed under a pressure of $6.666 \times 10^{-4}$ MPa (5 mmHg), and a foaming agent.

Furthermore, Patent Document 9 (Japanese Patent Application, First Publication No. 2007-169408) discloses styrene-based foamable resin particles which includes hexabromocyclododecane or tetrabromobisphenol A-bis(2,3-dibromopropyl ether) as the flame retardant and includes 4% by mass to 8% by mass of bromine derived from the flame retardant or the like.

SUMMARY OF INVENTION

However, the techniques in the related art described above have the following problems.

In the technique in the related art disclosed in Patent Document 1, the flame retardant is supplied to an extruder or an autoclave by being dissolved in advance in an organic solvent. However, using a volatile solvent in a step of dissolving the flame retardant in an organic solvent is not preferable since this exerts a serious negative influence on the environment, and the foam-molded article generates volatile organic compounds (VOC). Moreover, in a step of dissolving the flame retardant in a lower aliphatic hydrocarbon (butane or pentane) used for foaming, the foaming agent is volatilized, so the working environment deteriorates.

In the technique in the related art disclosed in. Patent Document 2, the flame retardant is dispersed such that the particle size thereof becomes 50 μm or less in the presence of a surfactant, and then polystyrene resin particles are impregnated with this dispersion as well as a softening agent, a flame-retarding aid, a plasticizer, and a foaming agent, thereby producing flame retardant-containing foamable polystyrene resin particles. However, in the method of impregnating the polystyrene resin particles with the flame retardant in this manner, though impregnating the vicinity of the surface of the polystyrene resin particles, the flame retardant is absent in the vicinity of the center of the resin particles, or only flame retardant-containing foamable polystyrene resin particles which contain a small amount of the flame retardant are obtained. Consequently, the mechanical strength of a flame-retarding polystyrene resin foam-molded article that is obtained by pre-foaming such resin particles and performing in-mold foam molding on the obtained prefoamed particles deteriorates, and the moldability and exterior thereof deteriorate.

In the technique in the related art disclosed in Patent Documents 3 and 9, an organic bromine compound such as hexabromocyclododecane is used as a flame retardant However, hexabromocyclododecane is a type 1 monitored chemical substance in the Chemical Substances Control Law. The persistency and high enrichment of this compound were pointed out by the safety inspection for existing chemical substances conducted by the Ministry of Economy, Trade and Industry, and this compound corresponds to an evaluation object of risk assessment in Europe. In this way, this compound has problems in safety, so there is a demand for not using this compound. Therefore, in the future, it will be difficult to use this type of organic bromine compound in the field of flame-retarding polystyrene resin foam-molded article.

Patent Document 4 discloses a suspension polymerization method as a specific process for producing the foamable polystyrene resin particles. In this method, hexabromocyclododecane participates in the whole styrene polymerization process. In addition, it is known that when added to the styrene polymerization process, hexabromocyclododecane hinders polymerization of styrene monomers. Consequently, the obtained foamable polystyrene resin particles contain a large amount of residual volatile organic compounds, which makes it difficult to counteract the sick house syndrome as desired recently. Therefore, hexabromocyclododecane is not suitable for producing heat-insulating materials for building materials or vehicle interior materials.

In the method, which is disclosed in Patent Documents 5 to 7, of simultaneously adding a flame retardant and a foaming agent when polystyrene resin particles are impregnated with the foaming agent and impregnating the polystyrene resin particles with the flame retardant and the foaming agent, if the flame retardant is added by being dissolved in an organic solvent, the used organic solvent remains in the resin particles, whereby the obtained foamable polystyrene resin particles contain a large amount of residual volatile organic compounds. Therefore, this method is not suitable for producing insulating materials for building materials or vehicle interior materials.

In addition, in the method disclosed in Patent Documents 5 to 7, the powdered flame retardant undergoes secondary agglomeration in a suspension, whereby the flame retardant is unevenly dispersed in the suspension. Consequently, the powdered flame retardant is unevenly absorbed in the resin particles, so a portion of the resin particles absorbs a large amount of the flame retardant.

Moreover, in the method of adding the flame retardant by impregnating the polystyrene resin particles with the flame retardant as described above, though the vicinity of the surface of the polystyrene resin particles is impregnated with the flame retardant, the flame retardant is absent in the vicinity of the center of the resin particles, or only resin particles which contain a small amount of the flame retardant is obtained. The mechanical strength of a polystyrene resin foam-molded article that is obtained by pre-foaming such resin particles and performing in-mold foam molding on the obtained prefoamed particles deteriorates, the dimensional stability is reduced, and the moldability and the exterior deteriorate. Accordingly, this molded article is not suitable for producing members for banking or vehicle interior materials.

The present invention has been made in consideration of the above circumstances, and an object thereof is to provide a flame-retarding polystyrene resin foam-molded article which uses a flame retardant that is highly safe for the environment and living organisms, has a sufficient flame-retarding performance, and is excellent in the mechanical strength, moldability exterior, and dimensional stability, a heat-insulating material for building materials, a banking member, and a vehicle interior material.

In order to accomplish the above object, the present invention provides flame retardant-containing foamable polystyrene resin particles that are obtained by granulating a polystyrene resin containing a flame retardant and a foaming agent, wherein the flame retardant has a bromine atom in a molecule, contains less than 70% by mass of bromine, has a benzene ring in a molecule, and has a 5% by mass decomposition temperature in a range of from 200° C. to 300° C.; the flame retardant is the sole source of bromine in the foamable polystyrene resin particles; a ratio (B:A) between (A) a % by mass of the flame retardant contained in the foamable polystyrene resin particles in the total foamable polystyrene resin particles and (B) a % by mass of the flame retardant contained in the foamable polystyrene resin particles in the surface of the foamable polystyrene resin particles is in the range of from 0.8:1 to 1.2:1; and the amount of the flame retardant added is in a range of from 0.5% by mass to 5.0% by mass, based on 100 parts by mass of the resin fraction in the foamable polystyrene resin particles.

It is preferable that the flame retardant-containing foamable polystyrene resin particles of the present invention further contain a carbon material.

In addition, it is further preferable that the flame retardant is contained in the foamable polystyrene resin particles in a range satisfying (1) at least 3% by weight and (2) $Y>1.0\ Ln(X)-1.5$ (in the formula, Y represents the content of the bromine-based flame retardant in terms of % by mass based on the mass of the foamable polystyrene resin particles, and X represents a value obtained by multiplying the specific surface area (m2/g) by the content of the carbon material, respectively) in terms of % by mass based on the mass of the foamable polystyrene resin particles.

The flame retardant-containing foamable polystyrene resin particles of the present invention are preferably obtained in a melt extrusion method in which the flame retardant-containing foamable polystyrene resin particles are obtained by adding a flame retardant and a foaming agent to a polystyrene resin and kneading this mixture in a resin supply device, extruding the molten resin containing the flame retardant and the foaming agent directly into a cooling liquid from small holes of a die that is attached to the leading end of the resin supply device, cutting the extrudate simultaneously with the extrusion, and cooling and solidifying the extrudate by bringing the extrudate into contact with the liquid.

In addition, the present invention provides flame-retarding polystyrene resin prefoamed particles that are obtained by heating the flame retardant-containing foamable polystyrene resin particles.

The flame-retarding polystyrene resin prefoamed particles of the present invention desirably contain bubbles of 0.2 to 1 mm and bubbles of 0.15 mm or less. In addition, it is further desirable that the bubbles of 0.15 mm or less have an occupation ratio of 10% to 90% per cross-sectional area of the polystyrene resin prefoamed particles.

Furthermore, it is preferable that the flame-retarding polystyrene resin prefoamed particles of the present invention further contain a carbon material.

The present invention also provides a flame-retarding polystyrene resin foam-molded article that is obtained by filling a cavity of a mold with the flame-retarding polystyrene resin prefoamed particles and heating and foaming the particles.

Moreover, in order to accomplish the object described above, the present invention provides foamable polystyrene resin particles for producing a heat-insulating material for building materials that are obtained by granulating a polystyrene resin containing a flame retardant and a foaming agent, wherein the flame retardant has a bromine atom in a molecule, contains less than 70% by mass of bromine, has a benzene ring in a molecule, and has a 5% by mass decomposition temperature in a range of from 200° C. to 300° C., and the formable polystyrene resin particles for producing a heat-insulating material for building materials are obtained by a melt extrusion method in which the foamable polystyrene resin particles for producing a heat-insulating material for building materials are obtained by adding the flame retardant and the foaming agent to the polystyrene resin and kneading this mixture in a resin supply device, extruding the molten resin containing the flame retardant and the foaming agent directly into a cooling liquid from small holes of a die that is attached to the leading end of the resin supply device, cutting the extrudate simultaneously with the extrusion, and cooling and solidifying the extrudate by bringing the extrudate into contact with the liquid.

In the foamable polystyrene resin particles for producing a heat-insulating material for building materials of the present invention, the total amount of contained aromatic organic compounds including a styrene-based monomer, ethylbenzene, isopropylbenzene, normalpropylbenzene, xylene, toluene, and benzene is preferably less than 500 ppm.

The present invention also provides prefoamed particles for producing a heat-insulating material for building materials that are obtained by heating the foamable polystyrene resin particles for producing a heat-insulating material for building materials.

In addition, the present invention provides a heat-insulating material for building materials that is obtained by tilling a cavity of a mold with the prefoamed particles for producing a heat-insulating material for building materials and heating and foaming the particles, wherein the density is in a range of from 0.010 g/cm³ to 0.050 g/cm³.

The present invention also provides a heat-insulating material for building materials that is obtained by filling a cavity of a mold with the prefoamed particles for producing a heat-insulating material for building materials and heating and foaming the particles, wherein in a foam-molded article thereof that is foamed 40-fold in terms of a foaming factor, an average chord length of bubbles is in a range of from 50 μm to 350 μm.

Moreover, in order to accomplish the object described above, the present invention provides foamable polystyrene resin particles for producing a banking member that are obtained by granulating a polystyrene resin containing a flame retardant and a foaming agent, wherein the flame retardant has a bromine atom in a molecule, contains less than 70% by mass of bromine, has a benzene ring in a molecule, and has a 5% by mass decomposition temperature in a range of from 200° C. to 300° C.; and the foamable polystyrene resin particles for producing a banking member are obtained by a melt extrusion method in which the foamable polystyrene resin particles are obtained by adding the flame retardant and the foaming agent to the polystyrene resin and kneading this mixture in a resin supply device, extruding the molten resin containing the flame retardant and the foaming agent directly into a cooling liquid from small holes of a die that is attached to the leading end of the resin supply device, cutting the extrudate simultaneously with the extrusion, and cooling and solidifying the extrudate by bringing the extrudate into contact with the liquid.

The present invention also provides prefoamed particles for producing a banking member that are obtained by heating the foamable polystyrene resin particles for producing a banking member.

In addition, the present invention provides a banking member that is obtained by filling a cavity of a mold with the prefoamed particles for producing a banking member and beating and foaming the particles, wherein the density is in a range of from 0.010 g/cm³ to 0.050 g/cm³.

The present invention also provides a banking member that is obtained by filling a cavity of a mold with the prefoamed particles for producing, a banking, member and heating and foaming the particles, wherein in a foam-molded article thereof that is foamed 50-fold in terms of a foaming factor, an average chord length of bubbles is in a range of from 40 μm to 200 μm.

Moreover, the present invention provides a banking member that is obtained by filling a cavity of a mold with the prefoamed particles for producing a banking member and heating and foaming the particles, wherein an oxygen index is 26 or greater, In addition, in order to accomplish the object described above, the present invention provides foamable polystyrene resin particles for producing a vehicle interior material that are obtained by granulating a polystyrene resin containing a flame retardant and a foaming agent, wherein the flame retardant has a bromine atom in a molecule, contains less than 70% by mass of bromine, has a benzene ring in a molecule, and has a 5% by mass decomposition temperature in a range of from 200° C. to 300° C.; the flame retardant is the sole source of bromine in the learnable polystyrene resin particles; a ratio (B:A) between (A) a by mass of the flame retardant contained in the foamable polystyrene resin particles in the total foamable polystyrene resin particles and (B) a % by mass of the flame retardant contained in the foamable polystyrene resin particles in the surface of the foamable polystyrene resin particles is in the range of from 0.8:1 to 12:1; and the amount of the flame retardant added is in a range of from 0.5% by mass to 5.0% by mass, based on 100 parts by mass of the resin fraction in the foamable polystyrene resin particles, and the foamable polystyrene resin particles for producing a vehicle interior material are obtained by a melt extrusion method in which the foamable polystyrene resin particles for producing a vehicle interior material are obtained by adding the flame retardant and the foaming agent to the polystyrene resin and kneading this mixture in a resin supply device, extruding the molten resin containing the flame retardant and the foaming agent directly into a cooling liquid from small holes of a die that is attached to the leading end of the resin supply device, cutting the extrudate simultaneously with the extrusion, and cooling and solidifying the extrudate by bringing the extrudate into contact with the liquid.

It is preferable that the foamable polystyrene resin particles for producing a vehicle interior material of the present invention further contain a carbon material.

In addition, it is further preferable that the flame retardant is contained in the foamable polystyrene resin particles in a range satisfying (1) at least 3% by weight and (2) $Y > 1.0 \ln(X) - 1.5$ (in the formula, Y represents the content of the bromine-based flame retardant in terms of % by mass based on the mass of the foamable polystyrene resin particles, and X represents a value obtained by multiplying the specific surface area (m2/g) by the content of the carbon material, respectively) in terms of % by mass based on the mass of the foamable polystyrene resin particles.

In the formable polystyrene resin particles for producing a vehicle interior material of the present invention, the total amount of contained aromatic organic compounds including a styrene-based monomer, ethylbenzene, isopropylbenzene, normalpropylbenzene, xylene, toluene, and benzene is preferably less than 500 ppm, The present invention also provides prefoamed particles for producing a vehicle interior material that are obtained by heating the foamable polystyrene resin particles for producing a vehicle interior material.

The prefoamed particles for producing a vehicle interior material of the present invention desirably contain bubbles of 0.2 to 1 mm and bubbles of 0.15 mm or less. In addition, it is further desirable that the bubbles of 0.15 mm or less have an occupation ratio of 10% to 90% per cross-sectional area of the polystyrene resin prefoamed particles.

Furthermore, it is preferable that the prefoamed particles for producing a vehicle interior material of the present invention further contain a carbon material.

Moreover, the present invention provides a vehicle interior material that is obtained by filling a cavity of a mold with the prefoamed particles for producing a vehicle interior material and heating and foaming the particles, wherein in a foam-molded article thereof that is foamed 40-fold in terms of a foaming factor, an average chord length of bubbles is in a range of from 40 μm to 350 μm.

In addition, the present invention provides a vehicle interior material that is obtained by obtained by filling a cavity of a mold with the prefoamed particles for producing a vehicle interior material and heating and foaming the particles, wherein the density is in a range of from 0.015 g/cm$^3$ to 0.066 g/cm$^3$.

In the foamable polystyrene resin particles of the present invention, the flame retardant is preferably one or two or more kinds selected from a group consisting of tetrabromobisphenol A and a derivative thereof.

Moreover, in the foam able polystyrene resin particles of the present invention the flame retardant is preferably one or two or more kinds selected from a group consisting of tetrabromobisphenol A-bis(2,3-dibromo-2-methylpropyl ether), tetrabromobisphenol A-bis(2,3-dibromopropyl ether), and tetrabromobisphenol A-bis(allyl ether).

The present invention also provides a process for producing flame retardant-containing foamable polystyrene resin particles, including adding a flame retardant that has a bromine atom in a molecule, contains less than 70% by mass of bromine, has a benzene ring in a molecule, and has a 5% by mass decomposition temperature in a range of from 200° C. to 300° C. and a foaming agent to a polystyrene resin and kneading this mixture in a resin supply device, extruding the molten resin containing the flame retardant and the foaming agent directly into a cooling liquid from small holes of a die that is attached to the leading end of the resin supply device, cutting the extrudate simultaneously with the extrusion, and cooling and solidifying the extrudate by bringing the extrudate into contact with the liquid so as to obtain the flame retardant-containing foamable polystyrene resin particles.

In addition, the present invention provides a process for producting foamable polystyrene resin particles for producing a heat-insulating material for building materials, including adding a flame retardant that has a bromine atom in a molecule, contains less than 70% by mass of bromine, has a benzene ring in a molecule, and has a 5% by mass decomposition temperature in a range of from 200° C. to 300° C. and a foaming agent to a polystyrene resin and kneading this mixture in a resin supply device, extruding the molten resin containing the flame retardant and the foaming agent directly into a cooling liquid from small holes of a die that is attached to the leading end of the resin supply device, cutting the extrudate simultaneously with the extrusion, and cooling and solidifying the extrudate by bringing the extrudate into contact with the liquid so as to produce foamable polystyrene resin particles, wherein the foamable polystyrene resin particles are obtained without using aromatic organic compounds including a styrene-based monomer, ethylbenzene, isopropylbenzene, normalpropylbenzene, xylene, toluene, and benzene.

Moreover, the present invention provides a process for producing foamable polystyrene, resin particles for producing a banking member, including adding a flame retardant that has a bromine atom in a molecule, contains less than 70% by mass of bromine, has a benzene ring in a molecule, and has a 5% by mass decomposition temperature in a range of from 200° C. to 300° C. and a foaming agent to a polystyrene resin and kneading this mixture in a resin supply device, extruding the molten resin containing the flame retardant and the foaming agent directly into a cooling liquid from small holes of a die that is attached to the leading end of the resin supply device, cutting the extrudate simultaneously with the extrusion, and cooling and solidifying the extrudate by bringing the extrudate into contact with the liquid so as to obtain the foamable polystyrene resin particles for producing a banking member according to the present invention.

The present invention also provides a process for producing foamable polystyrene resin particles for producing a vehicle interior material, including adding a flame retardant that has a bromine atom in a molecule, contains less than 70% by mass of bromine, has a benzene ring in a molecule, and has a 5% by mass decomposition temperature in a range of from 200° C. to 300° C. and a foaming agent to a polystyrene resin and kneading this mixture in a resin supply device, extruding the molten resin containing the flame retardant and the foaming agent directly into a cooling liquid from small holes of a die that is attached to the leading end of the resin supply device, cutting the extrudate simultaneously with the extrusion, and cooling and solidifying the extrudate by bringing the extrudate into contact with the liquid so as to produce the foamable polystyrene resin particles, wherein the foamable polystyrene resin particles are obtained without using aromatic organic compounds including a styrene-based monomer, ethylbenzene, isopropylbenzene, normalpropylbenzene, xylene, toluene, and benzene.

In the process for producing foamable polystyrene resin particles of the present invention, the flame retardant is preferably one or two or more kinds selected from a group consisting of tetrabromobisphenol A and a derivative thereof.

In the process for producing, foamable polystyrene resin particles of the present invention, the flame retardant is preferably one or two or more kinds selected from a group consisting of tetrabromobisphenol A-bis(2,3-dibromo-2-methylpropyl ether), tetrabromobisphenol A-his(2,3-dibromopropyl ether), and tetrabromobisphenol A-bis(allyl ether).

In the process for producing foamable polystyrene resin particles of the present invention, it is preferable that a master batch material containing a predetermined level of the flame retardant in a resin be supplied into the resin supply device together with the polystyrene resin, and melted and kneaded in this device.

The foamable polystyrene resin particles of the present invention contains a flame retardant that has a bromine atom in a molecule, contains less than 70% by mass of bromine, has a benzene ring in a molecule, and has a 5% by mass decomposition temperature in a range of from 200° C. to 300° C. This flame retardant is highly safe for the environment and living organisms. Particularly, when added to a polystyrene resin foam-molded article, a tetrabromobisphenol A derivative can impart a sufficient flame-retarding performance, and is highly safe for the environment and living organisms. Accordingly, the flame retardant can be used for producing flame-retarding polystyrene resin foam-molded articles for various uses.

In the flame retardant-containing foamable polystyrene resin particles of the present invention, a ratio (B:A) between (A) a % by mass of the flame retardant contained in the foamable polystyrene resin particles in the total foamable polystyrene resin particles and (B) a % by mass of the flame retardant contained in the learnable polystyrene resin particles in the surface of the foamable polystyrene resin particles is in the range of from 0.8:1 to 1.2:1. Consequently, compared to particles in which the flame retardant is unevenly distributed in the resin particles, the mechanical strength of the obtained polystyrene resin foam-molded article is increased, and the moldability and exterior of the obtained foam-molded article are also superior.

In addition, the foamable polystyrene resin particles for producing a heat-insulating material for building materials, the foamable polystyrene resin particles for producing a banking member, and the foamable polystyrene resin particles for producing a vehicle interior material of the present invention are obtained by a melt extrusion method in which the foamable polystyrene resin particles are obtained by adding a flame retardant and a foaming agent to a polystyrene resin and kneading this mixture in a resin supply device, extruding the molten resin containing the flame retardant and the foaming agent directly into a cooling liquid from small holes of a die that is attached to the leading end of the resin supply device, cutting the extrudate simultaneously with the extrusion, and cooling and solidifying the extrudate by bringing the extrudate into contact with the liquid. Accordingly, the flame retardant is evenly distributed in the resin particles. Therefore, compared to resin particles in which the flame retardant s unevenly distributed in the resin particles, the mechanical strength of the obtained insulating material for building materials, the banking member, and the vehicle interior material increases, and the dimensional stability and moldability of the obtained insulating material for building materials, the banking member, and the vehicle interior material are superior.

The polystyrene resin foam-molded article of the present invention is obtained by pre-foaming the foamable polystyrene resin particles by heating, filling the obtained pre-foamed particles in a cavity of a mold, and heating and foaming the particles. Accordingly, it is possible to provide flame-retarding polystyrene resin foam-molded articles (a heat-insulating material for building materials, a banking member, and a vehicle interior material) that use a flame retardant which is highly safe for the environment and living organisms, has a sufficient flame-retarding performance, and are excellent in the mechanical strength, moldability, dimensional stability, and exterior.

Moreover, since the flame retardant is used by being added in the polystyrene resin, it is possible to reduce the amount of a residual volatile organic compounds such as a styrene-based monomer contained in the foam-molded article. Therefore, the present invention can counteract the sick house syndrome.

According to the process for producing learnable polystyrene resin particles of the present invention, it is possible to efficiently produce foamable polystyrene resin particles having excellent effects as described above. Particularly, according to the process for producing flame retardant-containing foamable polystyrene resin particles of the present invention, it is possible to produce the flame retardant-containing foamable polystyrene resin particles in which (A) a % by mass of the flame retardant contained in the total resin particles is almost the same as (B) a % by mass of the flame retardant contained in the surface of the resin particles, and the flame retardant is evenly contained in the resin particles, with a high efficiency.

Particularly, according to the process for producing foamable polystyrene resin particles for producing a heat-insulating material for building materials and the process for producing foamable polystyrene resin particles for producing a vehicle interior material of the present invention, it is possible to produce foamable polystyrene resin particles for producing a heat-insulating material for building materials that contain a small amount of aromatic organic compounds including a styrene-based monomer, ethylbenzene, isopropylbenzene, normalpropylbenzene, xylene, toluene, and benzene, with a high efficiency.

In addition, in the process for producing foamable polystyrene resin particles of the present invention, by supplying a master batch material containing a predetermined level of the flame retardant in a resin into a resin supply device together with the polystyrene resin, and melting and kneading thein in this device, it is possible to cause the flame retardant to be contained more evenly in the resin particles.

Furthermore, according to the foamable polystyrene resin particles contain a carbon material, and contain the flame retardant in a range satisfying (1) at least 3% by weight and (2) Y>1.0 Ln(X)−1.5 (in the formula, Y represents the content of the bromine-based flame retardant in terms of % by mass based on the mass of the foamable polystyrene resin particles, and X represents a value obtained by multiplying the specific surface area (m2/g) by the content of the carbon material, respectively) in terms of % by mass based on the mass of the foamable polystyrene resin particles, it is possible to provide the foamable polystyrene resin particles for producing a polystyrene resin foam-molded article that is excellent in flame retardancy and heat insulating property.

Furthermore, according to the polystyrene resin pre-foamed particles contain bubbles of 0.2 to 1 mm and bubbles of 0.15 mm or less, it is possible to provide the polystyrene resin prefoamed particles for producing a polystyrene resin foam-molded article that is excellent in heat insulating property. In addition, according to the bubbles of 0.15 mm or less have the occupation ratio of 10% to 90% per cross-sectional area of the polystyrene resin prefoamed particles, it is possible to provide the polystyrene resin prefoamed particles for producing a polystyrene resin foam-molded article that is excellent in heat insulating property.

DESCRIPTION OF EMBODIMENTS

Hereinbelow, the embodiments of the present invention will be described with reference to drawings.

In the process for producing foamable polystyrene resin particles of the present invention, the foamable polystyrene resin particles are obtained by adding a flame retardant that has a bromine atom in a molecule, contains less than 70% by mass of bromine, has a benzene ring in a molecule, and has a 5% by mass decomposition temperature in a range of from 200° C. to 300° C. and a foaming agent to a polystyrene resin and kneading this mixture in a resin supply device, extruding the molten resin containing the flame retardant and the foaming agent directly into a cooling liquid from small holes of a die that is attached to the leading end of the resin supply device, cutting the extrudate simultaneously with the extrusion, and cooling and solidifying the extrudate by bringing the extrudate into contact with the liquid. In addition, the flame retardant is the sole source of bromine in the foamable polystyrene resin particles.

Figure 1:
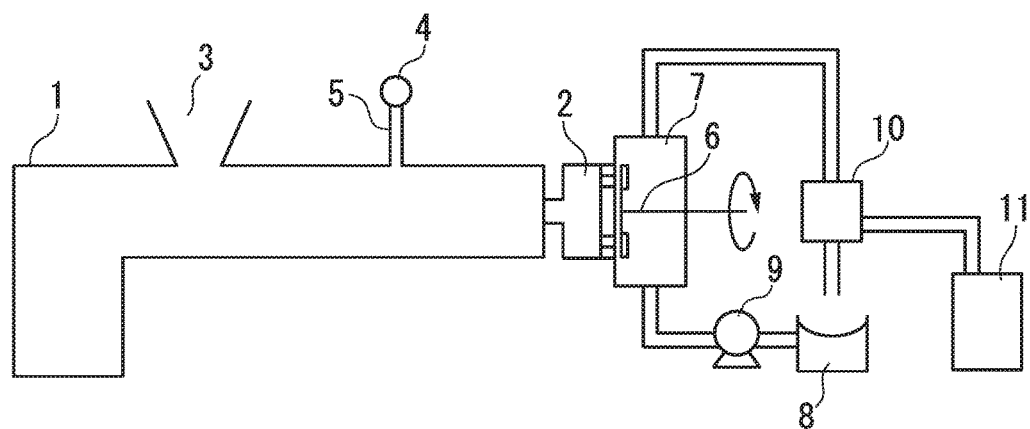
FIG. 1 is configuration view showing an example of a production apparatus used for the process for producing foamable polystyrene resin particles of the present invention.

FIG. 1 is a configuration view showing an example of a production apparatus used for the process for producing foamable polystyrene resin particles of the present invention. The production apparatus in this example includes an extruder 1 as a resin supply device; a die 2 that is provided at the leading end of the extender 1 and has many small holes; a raw material supply hopper 3 that introduce a raw material of a resin into the extruder 1; a high-pressure pump 4 that pushes a foaming agent into a molten resin in the extruder 1 through a foaming agent supply port 5; a cutting chamber 7 which is provided such that cooling water contacts a resin discharge surface of the die 2 where small holes are bored and into which the cooling water is circulatively supplied; a cutter 6 that is rotatably provided in the cutting chamber 7 so as to be able to cut the resin extruded from the small holes of the die 2; a dehydrating drier 10 with a solid-liquid separation function that obtains foamable particles by separating foamable particles which are transported from the cutting chamber 7 along the flow of the cooling water from the cooling water and dehydrating and drying the particles; a water tank 8 that stores the cooling water separated by the dehydrating drier 10 with a solid-liquid separation function; a high-pressure pump 9 that sends the cooling water in the water tank 8 to the cutting chamber 7; and a storage container 11 that stores the foamable particles which have been dehydrated and dried by the dehydrating drier 10 with a solid-liquid separation function.

As the extruder 1, any extruder using or not using a screw can be used. Examples of extruders using a screw include a single-axis extruder, a multi-axis extruder, a vent-type extruder, a tandem-type extruder, and the like. Examples of extruders not using a screw include a plunger-type extruder, a gear pump-type extruder, and the like. All of these extruders can use a static mixer. Among these extruders, extruders using a screw are preferable in terms of productivity. In addition, the cutting chamber 7 accommodating the cutter 6 can also use a device known in the related art that has been used in a granulation method implemented by melt extrusion of a resin.

In the learnable polystyrene resin particles of the present invention, the polystyrene resin is not particularly limited. Examples of the resin include homopolymers of a styrene-based monomer such as styrene, α-methylstyrene, vinyltoluene, chlorostyrene, ethylstyrene, i-propylstyrene, dimethylstyrene, or bromostyrene or a copolymer of these, and the like. The polystyrene resin is preferably a polystyrene resin containing 50% by mass or more of styrene, and more preferably polystyrene.

Moreover, the polystyrene resin may be a copolymer that contains the styrene monomer as a main component and is obtained by copolymerzing the styrene-based monomer with a vinyl monomer copolymerizable with the styrene-based monomer. Examples of the vinyl monomer include alkyl (meth)acrylates such as methyl (meth)acrylate, ethyl (meth)acrylate, butyl (meth)acrylate, or cetyl (meth)acrylate, (meth)acrylonitrile, dimethyl maleate, dimethyl fumarate, diethyl fumarate, ethyl fumarate, and bifunctional monomers such as divinylbenzene or alkylene glycol dimethacrylate.

If the polystyrene resin is a main component, other resins may be added. Examples of resins to be added include a rubber modified polystyrene resin to which a diene-based rubber-like polymer such as polybutadiene, a styrene-butadiene copolymer, or an ethylene-propylene-unconjugated diene three-dimensional copolymer has been added to improve the impact resistance of foam-molded articles, so-called high impact polystyrene. Alternatively, the examples include a polyethylene-based resin, a polypropylene-based resin, an acrylic resin, an acrylonitrile-styrene copolymer, an acrylonitrile-butadiene-styrene copolymer, and the like.

In the foamable polystyrene resin particles of the present invention, as the polystyrene resin as a raw material, commercially available general polystyrene resins, polystyrene resins (virgin polystyrene) that are not recyclable raw materials, such as polystyrene resins newly prepared by a method such as a suspension polymerization method can be used. Moreover, recycled raw materials obtained by performing recycling treatment on used polystyrene resin foam-molded articles can also be used. As the recycled raw material, it is possible to appropriately select a raw material having a weight average molecular weight Mw in a range of from 120,000 to 400,000, from recycled raw materials obtained by recovering used polystyrene resin foam-molded articles, for example, fish boxes, shock-absorbing materials for home appliances, and food packing trays, and recycling the materials by a limonene dissolution method or a heating volume reduction method. Alternatively, it is possible to use a plurality of recycled raw materials differing in the weight average molecular weight Mw by appropriately combining the materials.

In the foamable polystyrene resin particles of the present invention, as the flame retardant, a flame retardant that has a bromine atom in a molecule, contains less than 70% by mass of bromine, has a benzene ring in a molecule, and has a 5% by mass decomposition temperature in a range of from 200° C. to 300° C. is used. In this case, as the flame retardant to be used, one or two or more kinds of the flame retardants may be mixed, or other flame retardants may be added to the flame retardant as a main component.

It is difficult for a flame retardant that contains more than 70% by mass of bromine and does not have a benzene ring in a molecule to be a flame retardant that is highly safe for the environment and living organisms. Furthermore, if such a flame retardant is used, it is difficult to produce the effect of the present invention that provides flame-retarding polystyrene resin foam-molded articles that are excellent in mechanical strength, moldability, and exterior. The lower limit of the amount of bromine contained is not particularly limited. However, if the amount is 50% by mass or more, a flame-retarding efficiency becomes excellent, which is thus preferable. The more preferable range of the amount of bromine contained is from 55% by mass to 69% by mass.

If the 5% by mass decomposition temperature of the flame retardant is lower than 200° C., when the flame retardant and the polystyrene resin are melted and kneaded in the extruder 1, there is a possibility that the flame-retarding effect will not be obtained since the flame retardant is decomposed. When a flame retardant that has a 5% by mass decomposition temperature of higher than 300° C. is used, the flame retardancy of the obtained foam-molded article deteriorates. The 5% by mass decomposition temperature of the flame retardant is preferably in a range of from 230° C. to 300° C., more preferably in a range of from 240° C. to 295° C., and most preferably in a range of from 265° C. to 298° C.

In the present invention, examples of preferable flame retardants include one or two or more kinds selected from a group consisting of tetrabromobisphenol A and a derivative thereof. Among these flame retardants, one or two or more kinds of flame retardants selected from a group consisting of tetrabromobisphenol A-bis(2,3-dibromo-2-methylpropyl ether), tetrabromobisphenol A-bis(2,3-dibromopropyl ether), and tetrabromobisphenol A-bis(allyl ether) are particularly preferable. Among these, tetrabromobisphenol A-bis(2,3-dibromopropyl ether) and tetrabromobisphenol A-bis(2,3-dibromo-2-methylpropyl ether) having a high 5% by mass decomposition temperature are more preferable, and tetrabromobisphenol A-bis(2,3-dibromopropyl ether) is most preferable.

In the foamable polystyrene resin particles of the present invention, the amount of the flame retardant added is preferably in a range of from 0.5% by mass to 8.0% by mass, and more preferably in a range of from 1.0% by mass to 6.0% by mass, and most preferably in a range of from 0.5% by mass to 5.0% by mass, based on 100 parts by mass of the resin fraction in the flame retardant-containing foamable polystyrene resin particles. If the amount of the flame retardant added falls short of this range, the flame retardancy of the obtained foam-molded article deteriorates. If the amount of the flame retardant added exceeds this range, there is a possibility that the mechanical strength, moldability, and exterior of the obtained foam-molded article will deteriorate.

Here, since the flame retardant is the sole source of bromine in the foamable polystyrene resin particles and since the flame retardant contains less than 70% by mass of bromine, bromine content in the polystyrene resin particles which include 5.0% by mass of flame retardant is [5.0/(100+5.0)·70/100·100]3.333% by mass, Therefore, the foamable polystyrene resin particles according to the most preferable embodiment of the present invention include 3.3% by mass or less of bromine which is solely derived from the flame retardant.

In the foamable polystyrene resin particles of the present invention, the foaming agent is not particularly limited. For example, normal pentane, isopentane, cyclopentane, cyclopentadiene, and the like can be used alone, or as a mixture of two or more kinds of these. In addition, normal butane, isobutane, propane, and the like may be mixed with the above pentanes as a main component so as to be used. Particularly, since pentanes easily inhibit the resin particles from foaming when the resin particles are discharged to water flow from small holes of the die, the pentanes are suitably used. The amount of the foaming agent contained in the polystyrene resin is in a range of from 3 parts by mass to 10 parts by mass, and more preferably in a range of from 4 parts by mass to 7 parts by mass, based on 100 parts by mass of the polystyrene resin.

In the foamable polystyrene resin particles of the present invention, in addition to the flame retardant and the foaming agent, additives that are generally used for producing foamable polystyrene resin particles, for example, a foam-nucleating agent such as talc, calcium silicate, synthesized or naturally generated silicon dioxide, ethylene bis stearamide, or a methacrylic acid ester-based copolymer; a flame-retarding aid such as a diphenyl alkane or a diphenyl alkene; a colorant such as carbon black, iron oxide, or graphite; an antioxidant such as a phenol-based antioxidant, sulfur-based antioxidant, or a phosphorous-based antioxidant; a stabilizer such as hindered amines; and an ultraviolet absorber, can be optionally added to the polystyrene resin.

The foamable polystyrene resin particles of the present invention contain the carbon material as necessary.

The carbon material is not particularly limited as long as it does not impair the properties of the present invention, but examples thereof include carbon substances such as carbon black, activated carbon, graphite, graphene, coke, carbon nanofiber, mesoporous carbon, glassy carbon, hard carbon, and soft carbon, and preferably include conductive carbon black such as acetylene black, Ketjen black, carbon nanofiber, and carbon nanotube, and the like.

The content of the carbon material is 0.5 to 25 parts by mass with respect to 100 parts by mass of the resin particles.

In addition, it is further preferable that the foamable polystyrene resin particles containing the carbon material include a bromine-based flame retardant within a range satisfying
(1) at least 3% by weight and
(2) Y>1.0 Ln(X)−1.5 (in the formula, Y represents the content of the bromine-based flame retardant in terms of % by mass based on the mass of the foamable polystyrene resin particles, and X represents a value obtained by multiplying the specific surface area (m2/g) by the content of the carbon material, respectively) in terms of % by mass based on the mass of the foamable polystyrene resin particles. The reason why a foam-molded article having both the heat insulating property and the flame retardancy can be provided within this range is not certain, and it is a range empirically found by the inventors by repeated experiments.

In a case where the above two ranges are not satisfied, there is a possibility that compatibility between the heat insulating property and the flame retardancy becomes insufficient.

A preferable range of the value of X is 5 to 50,000, more preferably 10 to 10,000, and still more preferably 50 to 5,000. Specific values of X include 5, 10, 50, 100, 500, 1,000, 5,000, 10,000, and 50,000.

When the foamable polystyrene resin particles of the present invention are produced using the production apparatus shown in FIG. 1, first, the polystyrene resin as a raw material, the flame retardant, the foam-nucleating agent, and desired additives that are optionally added are weighed, and introduced into the extruder 1 from the raw material supply hopper 3. The polystyrene resin as a raw material may be introduced from a single raw material supply hopper after being sufficiently mixed in advance by being made into a pellet or granules. Alternatively, for example, when a plurality of lots is used, the polystyrene resin may be introduced from a plurality of raw material supply hoppers in which the supplication amount has been adjusted for each lot, and the supplied resins may be mixed in the extruder. In addition, when recycled raw materials of a plurality of lots are used in combination, it is preferable to sufficiently mix the raw materials of the plurality of lots in advance and remove foreign substances beforehand by using an appropriate sorting means such as magnetic sorting, sieving, gravity sorting, or blowing sorting.

In a preferable embodiment of the present invention, when the flame retardant described above is added, it is preferable to use a master batch material containing a predetermined level of the flame retardant in a resin, supply this master batch material into the resin supply device together with the polystyrene resin, and melt and knead the material and the resin in the device. By supplying the master batch material containing a predetermined level of the flame retardant in a resin into the resin supply device together with the polystyrene resin, and melting and kneading the material and the resin in the device, it is possible to cause the flame retardant to be contained more evenly in the resin particles.

The polystyrene resin, the flame retardant, the foaming aid, and other additives are supplied into the extruder 1, and then resin is melted by heating. Thereafter, while the flame retardant-containing molten resin is transported to the die 2, a foaming agent is pushed into the molten resin from the foaming agent supply port 5 by the high-pressure pump 4, whereby the flame retardant-containing molten resin is mixed with the foaming agent. While being further kneaded, the melt is then moved to the leading end side through a screen for removing foreign substances that is optionally provided in the extruder 1, whereby the melt to which the foaming agent has been added is extruded from small holes of the die 2 provided to the leading end of the extruder 1.

The resin discharge surface in which the small holes of the die 2 are bored is disposed in the cutting chamber 7 into which the cooling water is circulatively supplied. In the cutting chamber 7, the cutter 6 is rotatably provided so as to be able to cut the resin extruded from the small holes of the die 2. When the melt to which the foaming agent has been added is extruded from the small holes of the die 2 which is provided at the leading end of the extruder 1, the melt is cut in a form of particles, and at the same time, the melt is cooled by, contacting the cooling water. In this way, the melt is solidified while being inhibited from foaming, and becomes foamable polystyrene resin particles.

The formed foamable polystyrene resin particles are transported to the dehydrating drier 10 with a solid-liquid separation function from the cutting chamber 7 along with the flow of the cooling water. In the dehydrating drier 10, the foamable polystyrene resin particles are separated from the cooling water, and dehydrated and cooled. The dried foamable polystyrene resin particles are stored in the storage container 11.

The foamable polystyrene resin particles produced by the process for producing foamable polystyrene resin particles described above are obtained by granulating the polystyrene resin containing the flame retardant and the foaming agent. The flame retardant used for the foamable polystyrene resin particles of the present invention is highly safe for the environment and living organisms. Particularly, when added to a polystyrene resin foam-molded article, a tetrabromobisphenol A derivative can impart a sufficient flame-retarding performance, and this derivative is highly safe for the environment and living organisms. Therefore, the tetrabromobisphenol A derivative can be used for producing flame-retarding polystyrene resin foam-molded articles for various uses.

Hereinafter, the details of the flame-retarding foamable polystyrene resin particles, the foamable polystyrene resin particles for producing a heat-insulating material for building materials, the foamable polystyrene resin particles for producing a banking member, and the learnable polystyrene resin particles for producing a vehicle interior material of the present invention, which are produced by the method described above, will be described respectively.

In the flame-retarding foamable polystyrene resin particles of the present invention, the flame retardant has a bromine atom in a molecule, contains less than 70% by mass of bromine, and has a benzene ring in a molecule, and has a 5% by mass decomposition temperature in a range of from 200° C. to 300° C. Moreover, a ratio (B:A) between (A) a % by mass of the flame retardant contained in the foamable polystyrene resin particles in the total foamable polystyrene resin particles and (B) a % by mass of the flame retardant contained in the foamable polystyrene resin particles in the surface of the learnable polystyrene resin particles is in the range of from 0.8:1 to 1.2:1.

That is, in the flame-retarding foamable polystyrene resin particles of the present invention, the flame retardant is evenly contained in the resin particles. In the flame-retarding foamable polystyrene resin particles of the present invention, the ratio (B:A) is more preferably in a range of from 0.9:1 to 1.1:1, and even more preferably in a range of from 0.95:1 to 1.05:1. If the ratio (B:A) is out of the range of from 0.8:1 to 1.2:1, there is a possibility that the mechanical strength, moldability, exterior, and flame retardancy of the obtained flame-retarding polystyrene resin loam-molded article will deteriorate.

In the flame retardant-containing foamable polystyrene resin particles of the present invention, the ratio (B:A) between (A) a % by mass of the flame retardant contained in the foamable polystyrene resin particles in the total foamable polystyrene resin particles and (B) a % by mass of the flame retardant contained in the foamable polystyrene resin particles in the surface of the foamable polystyrene resin particles is in the range of from 0.8:1 to 1.2:1. Consequently, the flame retardant is evenly distributed in the resin particles. Therefore, compared to a case where the flame retardant is unevenly distributed in the resin particles, the mechanical strength of the obtained flame-retarding polystyrene resin foam-molded article is further increased, and the moldability and exterior of the obtained foam-molded article are superior.

The flame retardant-containing foamable polystyrene resin particles that are obtained by the above-described production method according to the present invention are prefoamed by heat treatment by means of vapor heating, by using devices and techniques that are known in the field of producing resin foam-molded articles, whereby flame-retarding polystyrene resin prefoamed particles are obtained. These prefoamed particles are prefoamed so as to have bulk density equivalent to the density of a foam-molded article to be produced. In the present invention, the bulk density is not limited, but generally, the bulk density is in a range of from 0.010 g/cm$^3$ to 0.033 g/cm$^3$, and preferably in a range of from 0.015 g/cm$^3$ to 0.025 g/cm$^3$.

The polystyrene resin prefoamed particles contain large bubbles and small bubbles, as necessary.

In the present specification, "large bubbles" mean bubbles having a bubble diameter of 0.2 to 1 mm. There is a possibility that sufficient heat insulating property cannot be imparted to the obtained foam-molded article in either a case where the bubble diameter of each of the large bubbles is less than 0.2 mm or a case where the bubble diameter of each of the large bubbles exceeds 1 mm. The bubble diameter of each of the large bubbles is preferably from 0.25 mm to 0.7 mm, and more preferably from 0.3 mm to 0.5 mm.

In addition, in the present specification, "small bubbles" mean bubbles having a bubble diameter of 0.15 mm or less. When the bubble diameter of each of the small bubbles exceeds 0.15 mm, there is a possibility that sufficient heat insulating property cannot be imparted to the obtained foam-molded article. The bubble diameter of each of the small bubbles is preferably 0.13 mm or less, and more preferably 0.10 mm or less.

On the cut plane of the prefoamed particles or foam-molded article, the bubbles mainly include large bubbles of 0.2 to 1 mm and small bubbles of 0.15 mm or less. On the other hand, bubbles having an intermediate bubble size, that is, bubbles having a bubble diameter of more than 0.15 mm and less than 0.2 mm are few. In addition, bubbles exceeding 1 mm are also few.

The occupation ratio of the small bubbles is preferably 10% to 90% per cross-sectional area of the prefoamed particle. In either a case where the occupation ratio of the small bubbles is less than 10% or a case where the occupation ratio exceeds 90%, there is a possibility that the sufficient heat insulating property cannot be imparted to the obtained foam-molded article. The occupation ratio of the small bubbles is more preferably 20% to 80% and most preferably 30% to 70%.

The occupation ratio of the large bubbles is preferably 10% to 90% per cross-sectional area of the pretbamed particle. In either a case where the occupation ratio of the large bubbles is less than 10% or a case where the occupation ratio exceeds 90%, there is a possibility that the sufficient heat insulating property cannot be imparted to the obtained foam-molded article. The occupation ratio of the large bubbles is more preferably 20% to 80% and most preferably 30% to 70%.

The heat treatment for prefoaming can be performed by placing the foainable polystyrene resin particles obtained as described above in an aqueous medium at a specific temperature and pressure.

The heat treatment temperature is 40° C. to 80° C. In either case where the heat treatment temperature is lower than 40° C. or a case where the heat treatment temperature is higher than 80° C., it is difficult to obtain foamed particles imparting foam-molded articles having sufficient heat insulating property. The heat treatment temperature is preferably 45° C. to 75° C., and more preferably 45° C. to 70° C.

The pressure in the heat treatment is preferably 0.5 MPa or more, more preferably 0.7 MPa or more, and still more preferably 1.0 MPa or more.

In the present invention, the bulk density of the polystyrene resin prefoamed particles refers to density measured in the following manner.

<Bulk Density and Bulk Foaming Factor of Prefoamed Particles>

First, Wg of the polystyrene resin prefoamed particles are collected as a measurement sample, and the measurement sample is caused to fall into a graduated cylinder by gravity. Thereafter, the bottom of the graduated cylinder is tapped so as to even out an apparent volume (V) cm$^3$ of the sample, and the mass and volume thereof are measured, whereby the bulk density of the polystyrene resin prefoamed particles is measured based on the following formula.

Bulk density (g/cm$^3$)=mass of measurement sample (W)/volume of measurement sample (V)

The bulk foaming factor of the prefoamed particles is a numerical value calculated by the following formula.

Bulk foaming factor (fold)=1/bulk density (g/cm$^3$)

By using devices and techniques known in the field of producing resin foam-molded articles, the polystyrene resin prefoamed particles are filled in a cavity of a mold, followed by in-mold foam molding by heating by means of vapor heating or the like, whereby a flame-retarding polystyrene resin foam-molded article is produced.

The density of the flame-retarding polystyrene resin foam-molded article of the present invention is not particularly limited, but the density is generally in a range of from 0.010 g/cm$^3$ to 0.033 g/cm$^3$, and preferably in a range of from 0.015 g/cm$^3$ to 0.025 g/cm$^3$.

In the present invention, the density of the polystyrene resin foam-molded article is density measured by the method disclosed in ES K7122: 1999 "Measurement of apparent density of foamed plastic and rubber".

<Density and Foaming Factor of Foam molded Article>

A test piece of 50 cm$^3$ or larger (100 cm$^3$ or larger in case of a semi-hard or soft material) is cut such that the original cell structure of the material is not changed. The mass thereof is measured, and the density of the foam-molded article is calculated by the following formula.

Density (g/cm$^3$)=mass of test piece (g)/volume of test piece (cm$^3$)

A test piece for adjusting test specimen conditions and for measurement is a test piece that is cut from a sample which has been 72 hours or longer since it was molded, and left as is for 16 hours or longer in atmospheric conditions of 23° C.±2° C.×50%±5% or 27° C.±2° C.×65%±5%.

The foaming factor of the foam-molded article is a numerical value calculated from the following formula.

Foaming factor (fold)=1/density (g/cm$^3$)

In the foamable polystyrene resin particles for producing a heat-insulating material for building materials, the foamable polystyrene resin particles for producing a banking member, and the foamable polystyrene resin particles for producing a vehicle interior material of the present invention, the flame retardant has a bromine atom in a molecule, contains less than 70% by mass of bromine, has a benzene ring in a molecule, and has a 5% by mass decomposition temperature in a range of from 200° C. to 300° C.

In the foamable polystyrene resin particles for producing a heat-insulating material for building materials, the foamable polystyrene resin particles for producing a banking member, and the foamable polystyrene resin particles for producing a vehicle interior material of the present invention, the flame retardant is evenly contained in the resin particles. If the flame retardant is unevenly contained in the resin particles, there is a possibility that the mechanical strength, moldability, dimensional stability, exterior, and flame retardancy of the obtained polystyrene resin foam-molded article will deteriorate.

In the foamable polystyrene resin particles for producing; a heat-insulating; material for building materials, the foamable polystyrene resin particles for producing a banking member, and the foamable polystyrene resin particles for producing a vehicle interior material of the present invention, the flame retardant is evenly distributed in the resin particles. Consequently, compared to a case where the flame retardant is unevenly distributed in the resin particles, the mechanical strength of the obtained foam-molded article (insulating material for building materials) is further increased, and the moldability and dimensional stability of the obtained insulating material for building materials, banking member, and vehicle interior material are also superior.

In the process for producing the foamable polystyrene resin particles for producing a heat-insulating material for building materials, the foamable polystyrene resin particles for producing a banking member, and the foamable polystyrene resin particles for producing a vehicle interior material according to the present invention, if a raw material of a resin containing a small amount of aromatic organic compounds including a styrene-based monomer, ethylbenzene, isopropylbenzene, normalpropylbenzene, xylene, toluene, and benzene is selected as a polystyrene resin as a raw material, it is possible to obtain learnable polystyrene resin particles without causing the above aromatic organic compounds to be mixed in the production process. Accordingly, the total amount of the aromatic organic compounds contained in the obtained foamable polystyrene resin particles for producing a heat-insulating material for building materials, foamable polystyrene resin particles for producing a banking member, and foamable polystyrene resin particles for producing a vehicle interior material can be set to less than 500 ppm. The total amount of the contained aromatic organic compounds is set to preferably 450 ppm or less, and more preferably 400 ppm or less. If the total amount of the contained aromatic organic compounds is small, the mechanical strength of the obtained insulating material for building materials, the banking member, and the vehicle interior material is increased, and the rate of dimensional change is reduced. Moreover, it is possible to counteract against the sick house syndrome as desired recently, which is thus suitable for producing the insulating material for building materials, the banking member, and the vehicle interior material. In addition, it is also possible to secure safety during the storage of the banking member.

In the present invention, the total amount of the contained aromatic organic compounds is a value measured by the following <Method of Measuring Amount of Contained Volatile Organic Compounds (VOC)>

<Method of Measuring Amount of Contained Volatile Organic Compounds (VOC)>

The foamable polystyrene resin particles (1 g) are weighed, and 1 ml of a dimethylformamide solution containing 0.1% by volume of cyclopentanol is further added thereto as an internal standard solution. Thereafter, dimethylformamide is added to the dimethylformamide solution so as to prepare 25 ml of measurement solution, and 1.8 of this measurement solution is supplied to a sample vaporizing chamber at 230° C., thereby obtaining charts of respective volatile organic compounds detected by gas chromatography. Subsequently, based on the standard curves of the respective volatile organic compounds, which have been measured in advance, the amount of the volatile organic compounds is calculated respectively from the respective charts, thereby calculating the amount of the volatile organic compounds in the foamable polystyrene resin particles.

In the present invention, among the above amounts of the contained volatile organic compounds (VOC), the total amount of the respective volatile organic compounds corresponding to the above-described aromatic organic compounds is taken as the "total amount of contained aromatic organic compounds".

The foamable polystyrene resin particles for producing a heat-insulating material for building materials, the foamable polystyrene resin particles for producing a banking member, and the foamable polystyrene resin particles for producing vehicle interior material, which are obtained by the production method according to the present invention, are prefoamed by being heated with vapor heating, by using devices and techniques known in the field of producing resin foam-molded articles, thereby producing flame-retarding polystyrene-based prefoamed particles (hereinafter, written as prefoamed particles). These prefoamed particles are prefoamed so as to have bulk density equivalent to the density of a foam-molded article (insulating material for building materials) to be produced. In the present invention, the bulk density is not limited. However, in a case of prefoamed particles for producing a heat-insulating material for building materials and for producing a banking member, the bulk density is generally in a range of from 0.010 g/cm³ to 0.050 g/cm³, and preferably in a range of form 0.015 g/cm³ to 0.033 g/cm³. On the other hand, in a case of prefoamed particles for producing a vehicle interior material, the bulk density is generally in a range of from 0.015 g/cm³ to 0.066 g/cm³, and preferably in a range of from 0.015 g/cm³ to 0.050 g/cm³.

The prefoamed particles are filled in a cavity of a mold and undergo in-mold foam molding by being heated with vapor heating or the like, by using devices and techniques known in the field of producing resin foam-molded articles, whereby a heat-insulating material for building materials, a banking member, and a vehicle interior material formed of flame-retarding polystyrene resin foam-molded articles are produced.

Though not particularly limited, the density of the insulating material for building materials and the banking member of the present invention is generally in a range of from 0.010 g/cm³ to 0.050 g/cm³, and preferably in a range of form 0.015 g/cm³ to 0.033 g/cm³. In addition, though not particularly limited, the density of the vehicle interior material of the present invention is generally in a range of from 0.015 g/cm³ to 0.066 g/cm³, and preferably in a range of from 0.015 g/cm³ to 0.055 g/cm³.

In the insulating material for building materials of the present invention, the average chord length of bubbles of a foam-molded article that is foamed 40-fold in terms of the foaming factor is preferably in a range of from 50 μm to 350 μm, and more preferably in a range of from 60 μm to 300 μm. In the present invention, the average chord length of bubbles is average chord length of bubbles of a foam-molded article that is measured by the following method.

<Average Chord Length>

The average chord length of bubbles of a foam-molded article refers to a length measured based on an ASTM D2842-69 test method. Specifically, a foam-molded article is cut into approximately two equal parts, and the cut plane is photographed by being magnified 100 times by using a scanning electron microscope (product name "S-3000N" manufactured by Hitachi, Ltd.). The photographed image is printed on a sheet of A4 paper, and a straight line having a length of 60 mm is drawn at an arbitrary site. From the number of bubbles on this straight line, an average chord length (1) of bubbles is calculated by the following formula.

$$\text{Average chord length } t = 60/(\text{number of bubbles} \times \text{magnification of picture})$$

In drawing the straight line, when the straight line contacts an edge of the bubbles, the bubbles are also included in the number of bubbles. In addition, when both ends of the straight line are positioned inside the bubbles without passing through the bubbles, the bubbles in which both ends of the straight line are positioned are also included in the number of bubbles. The average chord length is also calculated at five arbitrary sites in the photographed image in the same manner as described above, and an arithmetic mean value of these average chord lengths is taken as the average chord length of bubbles of the foam-molded article.

In the banking member of the present invention, the shape, dimension, and the like of the banking member are not particularly limited and appropriately determined according to the construction method or scale of the bank to be carried out. That is, the banking member can be formed into various sizes or shapes, such as a thick plate shape, a block shape, and a shape having engagement grooves or projections.

In the banking member of the present invention, the average chord length of bubbles of a foam-molded article that is foamed 50-fold in terms of the foaming factor is preferably in a range of from 40 μm to 200 μm, and more preferably in a range of from 50 μm to 150 μm.

In addition, in the banking member of the present invention, an oxygen index is 26 or greater. If the oxygen index is less than 26, there is a possibility that sufficient flame retardancy will not be obtained.

In the vehicle interior material of the present invention, the average chord length of a foam-molded article that is foamed 40-fold in terms of the foaming factor is preferably in a range of from 40 μm to 350 μm, and more preferably in a range of from 50 μm to 300 μm.

EXAMPLE

Hereinafter, the effects of the present invention will be described based on examples.

Example 1

Production of Foamable Polystyrene Resin Particles

A mixture, which was obtained by evenly mixing in advance 7 parts by mass (corresponding to 3.5 parts by mass in terms of the amount of a flame retardant) of a polystyrene resin master batch containing 50% by mass of tetrabromobisphenol A-bis(2,3-dibromo-2-methylpropyl ether) (manufactured by DAI-ICHI KOGYO SEIYAKU CO., LTD.) as a flame retardant with 0.3 parts by mass of fine talc powder based on 100 parts by mass of polystyrene resin (manufactured by TOYO STYRENE CO., LTD., product name "HRM-10N") as a substrate resin by using a tumbler mixer, was supplied into a single-axis extruder having a diameter of 90 mm at a rate of 160 kg/hr. After the resin was melted by heating, as a foaming agent, 6 parts by mass of isopentane based on 100 parts by mass of the resin was pushed into the extruder.

Subsequently, while the resin and foaming agent were kneaded in the extruder, cooling was performed such that the resin temperature at the leading end portion of the extruder became 190° C. Simultaneously, through dies for granulation which were kept at 320° C. by a heater connected to the extruder and provided with 200 nozzles having a diameter of 0.6 mm and a land length of 3.0 mm, the resin was extruded into a chamber in which 30° C. of cooling water circulated, and at the same time, a high-speed rotation cutter having 10 blades in the circumferential direction was pressed against the dies so as to perform cutting at 3,000 rpm. The cut resin was dehydrated and dried, whereby spherical foamable polystyrene resin particles were obtained. The obtained foamable resin particles did not exhibit deformation, hair-like projections, and the like, and the average particle size thereof was 1.1 mm.

The entire surface of the foamable polystyrene resin particles was evenly covered with 0.03 pans by mass of polyethylene glycol, 0.15 parts by mass of zinc stearate, 0.05 parts by mass of stearic acid monoglyceride, and 0.05 parts by mass of hydroxy stearic acid triglyceride based on 100 parts by mass of the obtained foamable polystyrene resin particles.

(Production of Foam-Molded Article)

The foamable polystyrene resin particles produced as described above were placed in a cool box at 15° C. and left as they were for 72 hours. Thereafter, the particles were supplied to a cylindrical batch-type pre-foaming machine, followed by heating by means of vapor at a blowing pressure of 0.05 MPa, thereby obtaining prefoamed particles. The bulk density of the obtained prefoamed particles was 0.015 g/cm³ (67-fold in terms of the bulk foaming factor). Subsequently, the obtained prefoamed particles were left as they were for 24 hours in a room temperature atmosphere and then filled in a mold having a rectangular cavity of a length of 400 mm×a width of 300 mm×a height of 50 mm. Thereafter, the inside of the cavity of the mold was heated for 20 seconds at a gauge pressure of 0.08 MPa, followed by cooling until the internal pressure of the cavity of the mold became 0.01 MPa, and the mold was opened to take out a rectangular foam-molded article of a length of 400 mm×a width of 300 mm×a height of 50 mm, The density of the obtained foam-molded article was 0.015 g/cm³ (67-fold in terms of the foaming factor).

The polystyrene resin, the foamable polystyrene resin particles, the prefoamed particles, and the foam-molded article of Example 1 produced in the above method were subjected to the following tests for evaluation.

As a method of checking the amount of the flame retardant contained in the total foamable polystyrene resin particles and in the surface thereof, for example, a method of quantitatively analyzing the amount of bromine contained in a flame retardant molecule by means of fluorescent X-ray analysis and calculating the amount of the contained flame retardant from the value obtained by the analysis by the following formula is exemplified.

Amount of contained flame retardant (% by mass)= measured value of the amount of contained brominex(molecular weight of total flame retardant×element content of bromine in total flame retardant)

A method of measuring a ratio (B:A) between (A) a by mass of the flame retardant contained in the foamable polystyrene resin particles in the total foamable polystyrene resin particles and (B) a by mass of the flame retardant contained in the foamable polystyrene resin particles in the surface of the foamable polystyrene resin particles will be described below.

<Measurement of % by mass (A) and (B) of Contained flame Retardant and Ratio (B:A) Thereof>

Figure 2:
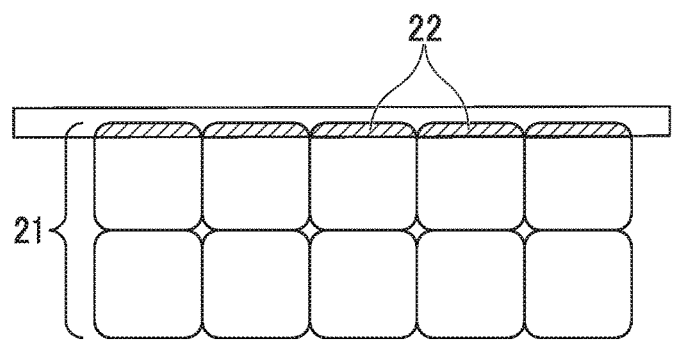
FIG. 2 is a schematic front view showing a state where the outermost surface portion of the polystyrene resin foam-molded article is cut for example.

The obtained polystyrene resin foam-molded article was dried at 50° C. for 24 hours, and then 2 g of a sample resin obtained from a polystyrene resin foam-molded article 21 was subjected to hot pressing at 190° C. as shown in FIG. 2, thereby preparing a tablet of 35 mmφ. After the mass of this tablet was measured, basis weight was calculated, and the amount of bromine contained in the resin was calculated by setting a balancing component to PS and performing an order analysis to measure the bromine amount by means of fluorescent X-ray analysis. From the obtained amount of bromine contained, the amount of bromine contained was calculated by the following formula, and the result was taken as (A) the % by mass of a flame retardant contained in the total resin particles.

% by mass of contained flame retardant in the foamable polystyrene resin particles in the total foamable polystyrene resin particles=measured value of amount of contained brominex(molecular weight of total flame retardant/element content of bromine in total flame retardant)

Next, as shown in FIG. 2, an outermost surface portion 22 of the foam-molded article was cut to a thickness of 0.3 mm with a ham slicer (manufactured by MISHIMA KOKI CO., LTD: FK-18N model), and 2 of a sample resin obtained from the outermost surface portion 22 of the foam-molded article was subjected to hot pressing at 190° C., thereby preparing a tablet of 35 mmφ. After the mass of this tablet was measured, basis weight was calculated, and amount of bromine contained in the resin was calculated by setting a balancing component to PS and performing an order analysis to measure the bromine amount by means of fluorescent X-ray analysis. From the obtained amount of bromine contained, the amount of the contained flame retardant was calculated by the following formula, and the result was taken as (B) the % by mass of a flame retardant contained in the surface of the resin particles.

% by mass of contained flame retardant in the foamabie polystyrene resin particles in the surface of foamable polystyrene resin particles=measured value of amount of contained brominex(molecular weight of total flame retardant/element content of bromine in total flame retardant)

Containers used for the analysis and measurement conditions were as follows. Measurement device: fluorescent X-ray analyzer manufactured by Rigaku Corporation RIX-2100 X-ray tube: vertical Rh/Cr tube (3/2.4 kW) analysis diameter: 30 mmφ slit: standard diffraction crystal: LIF detector: SC measurement mode: qualitative analysis (FP thin film method-BrPS30-balancing component C8H8)

By dividing (B) the amount of a flame retardant contained by (A) the amount of a flame retardant contained, which were calculated as described above, a ratio (B:A) between (A) and (B) was calculated.

The density of the polystyrene resin foam-molded article 21 as a measurement sample was set to 0.02 g/cm$^3$ (50-fold in terms of the foaming factor). When the density of the molded article 21 was less than 0.02 g/cm$^3$ due to defective foamability, the molded article 21 having minimum density was used as a measurement sample.

<Evaluation of Beads Foamability>

The foamable polystyrene resin particles obtained in examples (and comparative examples) were stored for 72 hours in a cool box at 15° C., and then supplied to a cylindrical batch type pre-foaming machine. The particles were heated for 2 minutes by vapor at an injection vapor pressure of 0.05 MPa, the bulk foaming factor of the obtained prefoamed particles were measured in the following manner, and beads foamability was evaluated based on the following criteria.

B (Excellent): bulk foaming factor of 60-fold or more

C (Fair): bulk foaming factor of 50-fold or more and less than 60-fold

D (Defective): bulk foaming factor of less than 50-fold

<Evaluation of Exterior of Foamed Product>

The polystyrene resin prefoamed particles were filled in a mold of a foam molding machine, and the particles were subjected to secondary foaming using vapor, thereby obtaining a cuboidal foam-molded article of a length of 400 mm×a width of 300 mm×a thickness of 50 mm.

The exterior of the foam-molded article was visually observed to evaluate the exterior of the foam-molded article based on the following criteria.

A (Extremely excellent): There were no gaps between foamed particles, and the surface was very smooth.

B (Excellent): There were no gaps between foamed particles, and the surface was smooth.

C (Fair): There were few gaps between foamed particles, and the smoothness of surface was slightly poor.

D (Defective): There were many gaps between foamed particles, and the smoothness of surface was very poor.

<Evaluation of Flame Retardancy>

Flame retardancy was evaluated by using one or all of the following two methods.

Method 1:

Flame retardancy was measured by the method disclosed in a measurement method A of JIS A 9511: 1995 "Foamed Plastic Lagging Materials"

As test pieces, five test pieces having a thickness of 10 mm, a length of 200 mm, and a width of 25 mm were cut from a foam-molded article sample, and a prescribed ignition limit pointing line and a combustion limit pointing line were drawn in the test pieces. After the test pieces were combusted to the ignition limit pointing line by using a candle for a fire source, the flame was set back, and the time (sec) from the moment of the setting back and to the extinguishment of the flame was measured to evaluate flame retardancy based on the following criteria.

B (Excellent): Flame was extinguished within 3 seconds in all five test pieces without making residual dust, and the test pieces were not combusted beyond the combustion limit pointing line.

D (Defective): Criterion B was not satisfied, or a self-extinguishing property was not observed.

Method 2:

A test piece with a size of a thickness of 10 mm×a length of 150 mm×a width of 10 mm was cut from the obtained foam-molded article by using a vertical cutter and cured in an oven at 50° C. for 7 days, and then the condition of the test piece was adjusted for 4 days at 23° C. and a relative humidity of 50%. The oxygen index was measured based on JIS K7201, and the flame retardancy was evaluated based on the following criteria.

B Excellent): Oxygen index of 26 or greater

D (Defective): Oxygen index of less than 26

<Evaluation of insulating Property of Foam-molded Article>

A cuboidal test piece having a length of 200 mm×a width of 200 mm×a thickness of 25 mm was cut from a foam-molded article. Thereafter, the thermal conductivity of this test piece was measured at a measurement temperature of 23° C. by a method using a planar heat flow meter based on JIS A1412, and the insulating property of the foam-molded article was judged based on the following criteria.

B (Excellent): Thermal conductivity of less than 0.040 (W/m·k)

D (Defective): Thermal conductivity of 0.040 (W/m·k) or more

<Measurement of Flame Retardant Decomposition Temperature>

A flame retardant (20 mg) was collected as a sample, and the mass reduction ratio of the sample was measured using a TG/DTA 300 model (manufactured by SEIKO Electronics industrial Co., Ltd.) which is a differential heat and calorie simultaneous measurement device, under a condition of a nitrogen gas amount of 30 ml/min, a heating temperature of 10° C./min, and a measurement temperature of 30° C. to 800° C. Front this measurement, a graph of which a vertical axis indicated the mass reduction rate and a horizontal axis indicated the temperature was obtained. Based on this graph, a temperature at the time when the mass reduction ratio of the sample had reached 5% was taken as the 5% by mass decomposition temperature.

<Measurement of Amount of Volatile Organic Compounds (VOC) Contained in Foamable Polystyrene Resin Particles>

Foamable polystyrene resin particles (1 g) were accurately weighed, and 1 ml of a dimethylformamide solution containing 0.1% by volume of cyclopentanol was added thereto as an internal standard solution. Thereafter, dimethylformamide was further added to the dimethylformamide solution so as to prepare 25 ml of a measurement solution.

This measurement solution (1.8 μl) was supplied to the sample vaporizing chamber at 230° C., thereby obtaining the respective charts of volatile organic compounds which were detected by gas chromatography manufactured by Shimadzu Corporation, product name of "GC-14A") under the following measurement conditions. Subsequently, based on the respective standard curves of the volatile organic compounds that had been measured in advance, the amount of the volatile organic, compounds were calculated respectively from the respective charts, thereby calculating the amount of the volatile organic compounds in the foamable polystyrene particles.

Detector: FID
Column: Manufactured by GL Sciences Inc, (3 mmφ×2.5 m)
Liquid phase; PEG-20M PT 25%
Carrier: Chromosorb W AW-DMCS
Mesh; 60/80
Column temperature: 100° C.
Detector temperature: 230° C.
DET temperature: 230° C.
Carrier gas: nitrogen
Carrier gas flow rate: 40 ml/min
<Comprehensive Evaluation>
Regarding the respective evaluation items of the above <Evaluation of Beads Foamability>, <Evaluation of Flame Retardancy>, <Evaluation of Exterior of Foam-molded Article>, and <Evaluation of Insulating Property of Foam-molded Article>, a comprehensive evaluation was carried out by giving Excellent (B) to those not given Defective OD) and giving Defective (D to those given one or more Defective (D).

The above-described measurements and evaluations were also appropriately performed on the following examples and comparative examples.

Example 2

A foam-molded article that was foamed 67-fold in terms of the foaming factor was produced in the same manner as in Example 1, except that tetrabromobisphenol A-bis(2,3-dibromopropyl ether) (manufactured by DAI-ICHI KOGYO SEIYAKU CO., LTD.) was used in the same amount, as a flame retardant.

Example 3

A foam-molded article that was foamed 67-fold in terms of the foaming factor was produced in the same manner as in Example 1, except that tetrabromobisphenol A-bis(allyl ether) (manufactured by DAI-ICHI KOGYO SEIYAKU CO., LTD) was used in the same amount, as a flame retardant.

Example 4

A foam-molded article that was foamed 67-fold in terms of the foaming factor was produced in the same manner as in Example 1, except that 3.2 parts by mass of tetrabromobisphenol A-bis(2,3-dibromopropyl ether) was mixed with 0.3 parts by mass of tetrabromobisphenol A-bis(allyl ether) so as to be used as a flame retardant.

Example 5

A foam-molded article was produced in the same manner as in Example 1, except that the bulk foaming factor of prefoamed particles was set to 40-fold, and that the foaming factor of the foam-molded article was set to 40-fold. The average chord length of bubbles of the foam-molded article was 183 μm.

Example 6

A foam-molded article that was foamed 67-fold in terms of the foaming factor was produced in the same manner as in Example 1, except that the amount of the flame retardant A mixed was set to 5.0 parts by mass.

Comparative Example 1

A foam-molded article was produced in the same manner as in Example 1, except that hexabromocyclodecane (manufactured by DAI-ICHI KOGYO SEIYAKU CO., LTD.) was used in the same amount, as a flame retardant.

Comparative Example 2

A foam-molded article was produced in the same manner as in Example 1, except that tris-(2,3-dibromopropyl)isocyanurate (manufactured by Nippon Kasei Chemical Co., Ltd) was used in the same amount, as a flame retardant.

Comparative Example 3

A foam-molded article was produced in the same manner as in Example 1, except that pentabromobenzyl acrylate (manufactured by DAI-ICHI KOGYO SEIYAKU CO., LTD.) was used in the same amount, as a flame retardant.

Comparative Example 4

A foam-molded article was produced in the same manner as in Example 1, except that tris(tribromoneopentyl)phosphate (manufactured by DAIHACHI CHEMICAL INDUSTRY CO, LTD) was used in the same amount, as a flame retardant.

Comparative Example 5

A foam-molded article that was foamed 67-fold in terms of the foaming factor was produced in the same manner as in Example 1, except that foamable polystyrene resin particles were obtained by a suspension polymerization method as a process for producing foamable polystyrene resin particles.

The suspension polymerization method will be described below in detail.

Tricalcium phosphate (120 g) (manufactured by Taihei Chemical Industrial Co., Ltd.), 4 g of sodium dodecylbenzenesulfonate, 140 g of benzoyl peroxide (purity of 75%), 30 g of t-butylperoxy-2-ethylhexyl monocarbonate, 40 kg of ion exchange water, and 40 kg of a styrene monomer were introduced to art autoclave equipped with a stirrer having an internal volume of 100 L, followed by dissolution and dispersion under stirring at 100 rpm, thereby forming a suspension.

Subsequently; the internal temperature of the autoclave was raised to 90° C. while the stirring blade performed stirring at 100 rpm, and then the temperature was kept at 90° C. for 6 hours.

Thereafter, the internal temperature of the autoclave was further raised to 120° C., and the temperature was kept at 120° C. for 2 hours. Next, the internal temperature of the autoclave was cooled to 25° C., the content of the autoclave was taken out, followed by dehydration, drying, and classification, thereby obtaining styrene-based resin particles having a particle size of 0.6 mm to 0.85 mm and a weight average molecular weight of 300,000.

Subsequently, 30 kg of pure water, 4 g of sodium dodecylbenzenesulfonate, and 100 g of magnesium pyrophosphate were introduced to a 100 L autoclave equipped with a stirrer, and 11 kg of the above-described polystyrene nucleus particles having a particle size of 0.60 mm to 0.85 mm and a weight average molecular weight of 300,000 was added thereto, followed by dispersion in the solution under stirring at 120 rpm.

Next, an emulsion prepared in advance was added to the reactor kept at 75° C. This emulsion was obtained by adding 88 g of benzoyl peroxide (purity of 75%) as a polymerization initiator and 5 kg of styrene in which 50 g of t-butylperoxy-2-ethylhexyl monocarbonate had been dissolved to a dispersion containing 6 kg of pure water, 2 g of sodium dodecylbenzenesulfonate, and 20 g of magnesium pyrophosphate, and emulsifying this mixture by means of stirring with a homomixer. Thereafter, the reactor was held as it was for 30 minutes such that the styrene and the polymerization initiator were absorbed well into the styrene-based resin particles, and then 28 kg of styrene was continuously added dropwise thereto for 160 minutes while the internal temperature of the autoclave was raised from 75° C. to 108° C. at a rate of 0.2° C./min.

Subsequently, 20 minutes after the completion of the dropwise addition of styrene, the temperature was raised to 120° C. at a rate of 1° C./min and kept as it was for 90 minutes, and polystyrene particles were obtained by seed polymerization.

Diisobutyl adipate (308 g) (manufactured by Taoka Chemical Co., Ltd., product name: D14A) was added to a dispersion containing 2 kg of hot water and 0.8 g of sodium dodecylbenzenesulfonate, followed by stirring with a homomixer, thereby preparing an emulsion.

Thereafter, the autoclave was cooled to 90° C. at a rate of and the above emulsion prepared in advance was added to the reactor. 30 minutes after the addition of the emulsion, 1540 g of tetrabromobisphenol A-bis(2,3-dibromo-2-methylpropyl ether) (manufactured by DAIHACHI CHEMICAL INDUSTRY CO, LTD) was added thereto as a flame retardant, and then the reactor was sealed. As a foaming agent, 3520 g of pentane (isopentane/normalpentane=20/80) was then pushed into the autoclave for 30 minutes by nitrogen pressurization, and the autoclave was held as it was for 3 hours. Thereafter, the internal temperature of the autoclave was cooled to 25° C., and the content of the autoclave was taken out, followed by dehydration, drying, and classification, thereby obtaining foamable polystyrene resin particles having a particle size of 0.85 mm to 1.2 mm and a weight average molecular weight of 300,000.

Comparative Example 6

A foam-molded article that was foamed 67-fold in terms of the foaming factor was produced in the same manner as in Comparative Example 5, except that tetrabromobisphenol A-bis(allyl ether) (manufactured by DAIRACHI CHEMICAL INDUSTRY CO, LID) was used in the same amount, as a flame retardant.

The amount of bromine contained in the flame retardant used in the Examples 1 to 6 and Comparative Examples 1 to 6, the presence of a benzene ring in the flame retardant molecule, and the 5% by mass decomposition temperature are summarized in Table 1.

In addition, the results of the measurement and evaluation of the Examples 1 to 6 and Comparative Examples I to 6 are summarized in Table 2.

TABLE 1

| | Flame retardant name | Amount of bromine contained (% by mass) | Benzene ring in flame retardant molecule | 5% by mass decomposition temperature (° C.) |
|---|---|---|---|---|
| a | Tetrabromobisphenol A-bis(2,3-dibromo2methyl-propyl ether) | 66 | Present | 259 |
| b | Tetrabromobisphenol A-bis(2,3-dibromo-propyl ether) | 68 | Present | 278 |
| c | Tetrabromobisphenol A-bis(allyl ether) | 51 | Present | 226 |
| d | Hexabromocyclo-dodecane | 75 | Absent | 247 |
| e | Tris-(2,3dibromo-propyl)isocyanurate | 67 | Absent | 282 |
| f | Pentabromobenzyl acrylate | 72 | Present | 319 |
| g | Tris(tribromo-neopentyl)phosphate | 71 | Absent | 309 |

TABLE 2

| | Resin fraction parts by mass) | Flame retardant parts by mass) | B:A | Beads foam-ability | Exterior of foamed product | Flame retardant (method 1) | Flame retardant (method 2) | Insulating product | Amount of VOC contained (ppm) | Compre-hensive evaluation |
|---|---|---|---|---|---|---|---|---|---|---|
| Example 1 | 100 | a 3.5 | 1.0:1.0 | B | B | B | B 27.5 | B 0.036 | 200 | B |
| Example 2 | 100 | b 3.5 | 1.0:1.0 | B | A | B | B 27.1 | B 0.037 | 193 | B |
| Example 3 | 100 | c 3.5 | 1.0:1.0 | B | C | B | B 26.7 | B 0.038 | 237 | B |
| Example 4 | 100 | b 3.2 c 0.3 | 1.0:1.0 | B | B | B | B 26.9 | B 0.037 | 216 | B |
| Example 5 | 100 | a 3.5 | — | B | B | B | — | B 0.032 | 203 | B |
| Example 6 | 100 | a 5.0 | — | B | B | — | B 30.1 | — | — | B |
| Comparative Example 1 | 100 | d 3.5 | 1.0:1.0 | D | C | B | B 26.2 | B 0.037 | 241 | D |

TABLE 2-continued

| | Resin fraction parts by mass) | Flame retardant parts by mass) | B:A | Beads foam-ability | Exterior of foamed product | Flame retardant (method 1) | Flame retardant (method 2) | Insulating product | Amount of VOC contained (ppm) | Compre-hensive evaluation |
|---|---|---|---|---|---|---|---|---|---|---|
| Comparative Example 2 | 100 | e 3.5 | 1.0:1.0 | D | D | B | D 25.7 | D 0.041 | 207 | D |
| Comparative Example 3 | 100 | f 3.5 | 1.0:1.0 | C | C | D | D 25.2 | D 0.040 | 234 | D |
| Comparative Example 4 | 100 | g 3.5 | 1.0:1.0 | D | D | D | D 25.4 | D 0.042 | 238 | D |
| Comparative Example 5 | 100 | a 3.5 | 1.3:1.0 | B | D | D | — | — | — | D |
| Comparative Example 6 | 100 | c 3.5 | 1.3:1.0 | B | D | D | — | — | — | D |

As the results of Tables 1 and 2 show, Examples 1 to 6 of the present invention that used flame retardants "a" to "c" having a bromine atom in an example molecule, containing less than 70% by mass of bromine, having a benzene ring in a molecule, and having a 5% by mass decomposition temperature in a range of from 200° C. to 300° C. were excellent in any of the beads foamability, the flame retardancy, and the exterior of a foamed article.

On the other hand, Comparative Example 1 that used a flame retardant "d" containing bromine as much as 75% by mass and not having a benzene ring in a molecule was poor in the beads foamability, and the exterior of the foamed article also slightly deteriorated.

Comparative Example 2 that used a flame retardant "e" not having a benzene ring in a molecule exhibited defective beads foamability, and the exterior of the foamed article was also defective.

Comparative Example 3 that used a flame retardant "f" containing a large amount of bromine at 75% by mass and having a 5% by mass decomposition temperature of higher than 300° C. exhibited slightly defective beads foamability and defective flame retardancy, and the exterior of the foamed article was slightly defective.

Comparative Example 4 that used a flame retardant "g" containing a large amount of bromine at 75% by mass, not having a benzene ring in a molecule, and having a 5% by mass decomposition temperature of higher than 300° C. was defective in all of the beads foamability, the flame retardancy, and the exterior of the foamed article.

Comparative Examples 5 and 6 that used a method of impregnating polystyrene resin particles with the flame retardants "a" and "c" containing less than 70% by mass of bromine, having a benzene ring in a molecule, and having a 5% by mass decomposition temperature in a range of from 200° C. to 300° C. were defective in all of the flame retardancy and the exterior of the foamed article.

Next, for the purpose of examining the relationship between the bubble diameter of the prefoamed particles or the foam-molded article and the thermal conductivity (heat insulating property), the foamable polystyrene resin particles, the prefoamed particles, and the foam-molded article shown in the following Examples "a" and "b" and Comparative Examples "a" and "b" were produced, and the following items were evaluated for these.

<Bubble Diameter of Large Bubbles or Small Bubbles>

The bubble diameters of the cut plane of the prefoamed particles or the foam-molded article were measured in the following manner.

First, the central portion of the foamed particles or the foam-molded article was cut. The cut plane was photo-graphed by being magnified 50 times by using a scanning electron microscope (product name "JSM-6360LV" manu-factured by NEC Corporation) and an enlarged photograph was obtained. Next, the bubble to be measured was specified of the bubbles appearing on the enlarged photograph, and the long diameter distance and the short diameter distance of the specified bubble were measured. The bubble diameter distance was calculated from the average value of these. Furthermore, the bubble diameter distance was divided by the magnification of the photograph, and it was defined as the bubble diameter of the specified bubble.

<Occupation Ratio of Bubbles>

The ratio of the total area of bubbles to be measured to the cross-sectional area (occupation ratio of bubbles) on the cut plane of the prefoamed particles or the foam-molded article was measured in the following manner.

In the bubbles appearing on the enlarged photograph, the bubbles to be measured were filled black, and the total of the tilled areas, that is, the total area occupied by the bubbles to be measured was determined. The total of the filled areas can be calculated using, for example, a measuring instrument which is commercially available under the product name "PLANIX 5000" from TA MAYA TECHNICS INC.

The ratio of the total area of small bubbles having a bubble diameter of 0.15 mm or less (occupation ratio of small bubbles) to the cross-sectional area was calculated by the following formula.

(Ratio of total area of small bubbles to cross-sectional area [%])×100×total area of small bubbles/cross-sectional area Similarly, the ratio of the total area of large bubbles having a bubble diameter of 0.2 to 1 mm (occupation ratio of large bubbles) to the cross-sectional area was calculated by the following formula.

(Ratio of total area of large bubble cross-sectional area [%])=100×total area of large bubbles/cross-sectional area <Thermal Conductivity>

A cuboidal test piece having a length of 200 mm×a width of 200 mm×a thickness of 30 mm was cut from a foam-molded article. Next, the cut test piece was allowed to stand for 72 hours in a thermostat at 60° C. to remove the foaming agent contained in the foam-molded article, and then cured at a temperature of 23° C.±1° C. and a humidity of 50%±10% for 24 hours or longer to prepare test piece for thermal conductivity measurement. The thermal conductivity (W/m·K) of the test piece for measurement was measured at a measurement temperature of 23° C. by a method using a planar heat flow meter in accordance with MS A1412-2 (1999 "Foamed Plastic Lagging Material"). From the value of the obtained thermal conductivity (W/m·K), the heat insulating property was evaluated according to the following criteria.

0.0310 (W/m·K) or less: The heat insulating property is further excellent (A)

More than 0.0310 and 0.03.20 or less: The heat insulating property is more excellent (B)

More than 0.0320 and 0.0340 or less: The heat insulating property is excellent (C)

More than 0.0340 (W/m·K): The heat insulating property is poor (D)

In the present invention, the value of the thermal conductivity of the foam-molded article is the value after removal of the foaming agent contained in the foam-molded article. In a case where measurement is performed without removing the foaming agent in the foam-molded article, since the thermal conductivity of the foaming agent such as butane or pentane is lower than the thermal conductivity of air, the value of the thermal conductivity of the foam-molded article is further reduced by approximately 0.002 (W/m·K).

Example a 2,000 g of foamable polystyrene resin particles obtained in the same manner as in Example 1, 2,000 a of water, 6 g of magnesium pyrophosphate, and 0.3 g of sodium dodecylbenzenesulfonate were supplied to a polymerization vessel equipped with a stirrer having an internal volume of 5 L, sealed, and nitrogen is pushed into the vessel at 30° C. until the internal pressure of the polymerization vessel reached 1.0 MPa. Subsequently, the mixture was heated to 60° C. with stirring, kept for 1 hour, and then cooled to 25° C. or lower. Thereafter, the entire surface of the particles was evenly covered with 0.03 parts by mass of polyethylene glycol, 0.15 parts by mass of zinc stearate, 0.05 pans by mass of stearic acid monoglyceride, and 0.05 parts by mass of hydroxy stearic acid triglyceride based on 100 parts by mass of the particles. The obtained particles were heated to prefoam to a bulk density of 0.019 g/cm³ to obtain prefoamed particles.

The prefoamed particles were aged at 20° C. for 24 hours. The prefoamed particles were formed of large bubbles having a bubble diameter of 0.2 to 1 mm and small bubbles of 0.15 mm or less, and small bubbles of 0.15 mm or less per cross-sectional area of the foam had a 45% occupation ratio. Next, the prefoamed particles were filled in a mold, and heated and foamed to obtain a foam-molded article having a length of 400 mm×a width of 300 mm×a thickness of 30 mm. After drying this foam-molded article in a drying chamber at 50° C. for 6 hours, the density of the foam-molded article was measured and found to be 0.020 g/cm³. The foam-molded article has no shrinkage, is excellent in appearance, and is formed of large bubbles having a bubble diameter of 0.2 to 1 mm and small bubbles of 0.15 mm or less to form the foam. Small bubbles of 0.15 mm or less per cross-sectional area of the foam had a 45% occupation ratio. in addition, the thermal conductivity of the foam was 0.033 w/mk.

Example b 5 parts by mass of acetylene black (Denka Black granular grade, average primary particle diameter 35 nm, specific surface area 69 m²/g, manufactured by Denka Company Limited), 0.5 parts by mass of fine talc powder as an inorganic foam-nucleating agent, and 5 parts by mass of tetrabromobisphenol A-bis(2,3-dibromo-2-methylpropyl ether) as a flame retardant, based on 95 pails by mass of virgin polystyrene having a weight average molecular weight of 200,000 (manufactured by TOYO STYRENE CO., LTD., product name "HRM-10N") were continuously supplied to a single-axis extruder having a diameter of 90 mm at a rate of 150 kg/hr. As the temperature inside the extruder, the maximum temperature was set at 220° C., and after melting the resin, 6 parts by mass of isopentane was pushed into the extruder based on 100 parts by mass of the resin as a foaming agent. The resin and the foaming agent were kneaded and cooled in the extruder and the resin temperature at the tip of the extruder was kept at 170° C., and the pressure at the resin introduction part of the die was kept at 15 MPa. A foaming agent-containing molten resin was extruded into a cutting chamber connected to the discharge side of the die and circulated with water at 30° C. from a die having 200 small holes having a diameter of 0.6 mm and a land length of 3.0 mm, and extrusion were simultaneously cut with a high-speed rotation cutter with 10 blades in the circumferential direction. The cut particles were conveyed to a particle separator while cooling with circulating water to separate the particles from the circulating water. Furthermore, the collected particles were dehydrated and dried to obtain foamable polystyrene resin particles. The foamable polystyrene resin particles had acetylene black:styrene-based resin=1:19 (mass ratio). In addition, the foamable polystyrene resin particle was substantially spherical with no deformation, hair-like projections, or the like, and the average particle diameter was approximately 1.1 mm.

In the same manner as in Example "a", the foamable polystyrene resin particles were injected with nitrogen in a polymerization vessel equipped with a stirrer, and the particles obtained through the steps of heating, cooling taking out, and coating were heated to prefoam to a bulk density of 0.019 g/cm³ to obtain prefoamed particles.

The prefoamed particles were aged at 20° C. for 24 hours. The prefoamed particles were formed of large bubbles having a bubble diameter of 0.2 to 1 mm and small bubbles of 0.15 mm or less, and small bubbles of 0.15 mm or less per cross-sectional area of the foam had a 50% occupation ratio. Next, the prefoamed particles were filled in a mold, and heated and foamed to obtain a foam-molded article having a length of 400 mm×a width of 300 mm×a thickness of 30 atm. After drying this foam-molded article in a drying chamber at 50° C. for 6 hours, the density of the foam-molded article was measured and found to be 0.020 g/cm³. The foam-molded article has no shrinkage, is excellent in appearance, and is formed of large bubbles having a bubble diameter of 0.2 to 1 min and small bubbles of 0.15 mm or less to form the foam. Small bubbles of 0.15 mm or less per cross-sectional area of the foam had a 50% occupation ratio. In addition, the thermal conductivity of the foam was 0.029 w/mk.

Comparative Example a

The foamable polystyrene resin particles obtained in the same manner as in Example 1 were heated to prefoam to a bulk density of 0.019 g/cm³ to obtain prefoamed particles. The prefoamed particles were aged at 20° C. for 24 hours. Next, the prefoamed particles were filled in a mold, and heated and foamed to obtain a foam-molded article having a length of 480 mm×a width of 300 mm×a thickness of 30 min. After drying this foam-molded article in a drying chamber at 50° C. for 6 hours, the density of the foam-molded article was measured and found to be 0.020 g/cm³. In addition, the thermal conductivity of the foam was 0.037 w/mk.

Comparative Example b

The foamable polystyrene resin particles obtained in the same manner as in Example "b" were injected with nitrogen in a polymerization vessel equipped with a stirrer, and the particles obtained without the steps of heating and cooling were heated to prefoam to a bulk density of 0.019 g/cm³ to obtain prefoamed particles. The prefoamed particles were aged at 20° C. for 24 hours. Next, the prefoamed particles were filled in a mold, and heated and foamed to obtain a foam-molded article having a length of 400 mm×a width of 300 mm×a thickness of 30 mm. After drying this foam-molded article in a drying chamber at 50° C. for 6 hours, the density of the foam-molded article was measured and found to be 0.020 g/cm³. In addition, the thermal conductivity of the foam was 0.032 w/mk.

The measurement and evaluation results of Examples "a" and "b", and Comparative Examples "a" and "b" are summarized in Table 3.

TABLE 3

| | Heating Temperature (° C.) | Occupation Ratio (%) of Small Bubbles having Diameter of 0.15 mm or less of Prefoamed Particles | Thermal Conductivity (0.02 g/cm³ Times Molded Article Density) |
|---|---|---|---|
| Comparative Example a | | 1 | 0.037 (D) |
| Example a | 60 | 45 | 0.033 (C) |
| Comparative Example b | | 1 | 0.032 (B) |
| Example b | 60 | 50 | 0.029 (A) |

From the above results, it was found that in a case where the foamable polystyrene resin particles were heat-treated before prefoaming, the heat insulating property of the foam-molded article was improved. In addition, it was found that by adding the carbon material to foamable polystyrene resin particles, the heat insulating property of the foam-molded article was improved.

Next, for the purpose of examining the relationship between the presence of the carbon material and the flame retardant in the foamable polystyrene resin particles and the flame retardancy, the foamable polystyrene resin particles, the prefoamed particles, and the foam-molded article shown in the following Example "c" and Comparative Example "c" were produced, and the following items were evaluated based on these.

<Amount of Carbon Material in Resin>

The amount of carbon material in the resin was measured using a differential thermogravimetric simultaneous measurement apparatus TG/DIA 6200 (manufactured by SII Nano Technology Inc.). For example, in a case of resin particles, prefoamed particles, and a foam-molded article containing a foaming agent or an organic solvent in a resin, the mixture was allowed to stand in a thermostatic chamber at 120° C. for 2 hours to remove the foaming agent and the organic solvent in the resin to obtain a measurement sample.

Approximately 15 mg of the sample was filled so that there was no gap at the bottom of the platinum measurement container, and measured using alumina as a reference substance. As a temperature condition, the temperature is raised from 30° C. to 520° C. at a rate of 10° C./min and a nitrogen gas flow rate of 230 mL/min, and then the temperature is raised from 520° C. to 800° C. at a rate of 10° C./min and an air flow rate of 160 mL/min. Based on the obtained TG curve vertical axis: TG (%), horizontal axis: temperature (° C.)), the weight loss of the sample weight when raising temperature from 520° C. to 800° C. was calculated and used as the amount of carbon material w (% by mass).

The mass ratio of the carbon material and the styrene-based resin at this lime has the following relationship.

Carbon material:styrene-based resin=1:(100/w−1)

w: Value of by mass of carbon material obtained from measurement result

In addition, in a case of foamed particles, a foam-molded article, and heat insulating material for living space obtained from the same styrene-based resin formable particles, the mass ratio of the carbon material and the styrene-based resin is approximately the same value.

<Specific Surface Area>

The specific surface area (m²/g) of the carbon material was measured in accordance with ASTM D-6556.

<Flame Retardant Content>

As a method of examining the content of the flame retardant of the foamable polystyrene resin particles or the prefoamed particles or the foam-molded article, as in the case of Example 1, a method of quantitatively analyzing the bromine content in the flame retardant molecule by fluorescent X-ray analysis and calculating the flame retardant content from the obtained value can be mentioned.

That is, 2 to 3 g of the foamable polystyrene resin particles or the prefoamed particles or the foam-molded article were pressed at a temperature of 200° C. to 230° C. using a hot press molding machine to prepare a tablet having a thickness of 1 mm and a diameter of 35 mm, and the tablet was used as a measurement sample.

Using the fluorescent X-ray measuring apparatus RIX-2100 (manufactured by Rigaku Corporation), the intensity of Br-Kβ1 was measured under the same conditions as in Example 1, and an element content of bromine was determined by the order analysis method.

From the obtained the element content of bromine, the flame retardant content was calculated by the following formula.

Amount of contained flame retardant (% by mass)= measured value of the amount of contained bromine×(molecular weight of total flame retardant×element content of bromine in total flame retardant)

Example: In a Case of Containing Tetrabromobisphenol A-bis(2,3-dibromo-2-methylpropyl ether), molecular weight of total flame retardant/element content of bromine in total flame retardant=(971.2/639.2)

Example c

The foamable polystyrene resin particles obtained by the same manner as in Example "b", except that 6 parts by mass of tetrabromobisphenol A-bis(2,3-dibromo-2-methylpropyl ether) was added as a flame retardant, were heated to prefoam to a bulk density of 0.019 g/cm³ to obtain prefoamed particles. The prefoamed particles were aged at 20° C. for 24 hours. Next, the prefoamed particles were filled in a mold, and heated and foamed to obtain a foam-molded article having a length of 400 mm×a width of 300 mm×a thickness of 30 mm. After drying this foam-molded article M a drying chamber at 50°

C. for 6 hours, the density of the foam-molded article was measured and found to be 0.020 g/cm³.

Comparative Example c

The foamable polystyrene resin particles, the prefoamed particles, and the foam-molded article were obtained in the same manner as in Example "c", except that the amount of the flame retardant was changed to 3.5 parts by mass.

The measurement and evaluation results of Example "c" and Comparative Example "c" are summarized in Table 4.

TABLE 4

| | Specific Surface Area A m²/g | Content B % by mass | X = A × B | 1.0 Ln (X) − 1.5 | Content of flame retardant Y % by mass | Flame retardancy |
|---|---|---|---|---|---|---|
| Example c | 69 | 4.8 | 331 | 4.3 | 5.4 | B |
| Comparative Example c | 69 | 4.8 | 331 | 4.3 | 3.3 | D |

From the above results, in a case where a bromine-based flame retardant is contained in the foamable polystyrene resin particles within a range satisfying
(1) at least 3% by weight and
(2) Y>1.0 Ln(X)−1.5 (in the formula, Y represents the content of the bromine-based flame retardant in terms of % by mass based on the mass of the foamable polystyrene resin particles, and X represents a value obtained by multiplying the specific surface area (m2/g) by the content of the carbon material, respectively) in terms of % by mass based on the mass of the foamable polystyrene resin particles, it is found that a foam-molded article having good flame retardancy can be obtained.

INDUSTRIAL APPLICABILITY

The present invention relates to a flame-retarding polystyrene resin foam-molded product which uses a flame retardant that is highly safe for the environment and living organisms, has a sufficient flame-retarding performance, and is excellent in the mechanical strength, moldability, exterior, and heat insulating property, and to foamable polystyrene resin particles used for producing the molded product and a process for production thereof The polystyrene resin foam-molded article of the present invention is suitably used for a foam-molded article which is required to have flame retardancy and heat insulating property, for example, for building materials, members for banking, vehicle interior materials, and the like.

What is claimed is:
1. Foamable polystyrene resin particles that are obtained by granulating a polystyrene resin containing a flame retardant and a foaming agent,
wherein the flame retardant has a bromine atom in a molecule, contains less than 70% by mass of bromine, has a benzene ring in a molecule, and has a 5% by mass decomposition temperature in a range of from 200° C. to 300° C.,
the flame retardant is the sole source of bromine in the foamable polystyrene resin particles;
A represents a % by mass of the flame retardant contained in the total foamable polystyrene resin particles, B represents a % by mass of the flame retardant contained in the surface of the resin particles, and a ratio of B:A is in a range of from 0.8:1 to 1.2:1 when A is defined as 1,
an amount of the flame retardant added is in a range of from 0.5% by mass to 5.0% by mass, based on 100 parts by mass of a total polymer fraction in the foamable polystyrene resin particles, and
the foamable polystyrene resin particles further comprise a carbon material selected from the group consisting of a conductive carbon black and graphite, and a content of the carbon material is 0.5 to 25 parts by mass with respect to 100 parts by mass of the resin particles,
wherein the flame retardant is contained in the foamable polystyrene resin particles in a range satisfying
(1) at least 3% by mass based on the mass of the foamable polystyrene resin particles and in a range from 0.5% by mass to 5.0% by mass based on 100 parts by mass of a total polymer fraction in the foamable polystyrene resin particles, and
(2) Y>1.0 Ln(X)−1.5, wherein Y represents the content of the bromine-based flame retardant in terms of % by mass based on the mass of the foamable polystyrene resin particles, and X represents a value obtained by multiplying the specific surface area (m²/g) of the carbon material by the content of the carbon material in terms of % by mass based on the mass of the foamable polystyrene resin particles.

2. The foamable polystyrene resin particles according to claim 1 that are obtained by a melt extrusion method in which flame retardant-containing foamable polystyrene resin particles are obtained by adding the flame retardant and the foaming agent to the polystyrene resin and kneading this mixture in a resin supply to obtain a molten resin mixture device, extruding the molten resin mixture containing the flame retardant and the foaming agent directly into a cooling liquid from small holes of a die that is attached to a leading end of the resin supply device thereby forming an extrudate, cutting the extrudate simultaneously with the extrusion, and cooling and solidifying the extrudate by bringing the extrudate into contact with the cooling liquid.

3. The foamable polystyrene resin particles according to claim 1,
wherein the flame retardant is at least one selected from the group consisting of tetrabromobisphenol A and a derivative thereof.

4. The foamable polystyrene resin particles according to claim 3,
wherein the flame retardant is at least one selected from the group consisting of tetrabromobisphenol A-bis(2, 3-dibromo-2-methylpropyl ether), tetrabromobisphenol A-bis(2,3-dibromopropyl ether), and tetrabromobisphenol A-bis(allyl ether).

5. Polystyrene resin prefoamed particles that are obtained by heating the foamable polystyrene resin particles according to claim 1.

6. The polystyrene resin prefoamed particles according to claim 5, which contain bubbles of 0.2 to 1 mm and bubbles of 0.15 mm or less.

7. The polystyrene resin prefoamed particles according to claim 6, wherein the bubbles of 0.15 mm or less have an occupation ratio of 10% to 90% per cross-sectional area of the polystyrene resin prefoamed particles.

8. Foamable polystyrene resin particles for producing a vehicle interior material that are obtained by granulating a polystyrene resin containing a flame retardant and a foaming agent, wherein the flame retardant has a bromine atom in a molecule, contains less than 70% by mass of bromine, has a benzene ring in a molecule, and has a 5% by mass decomposition temperature in a range of from 200° C. to 300° C., the flame retardant is the sole source of bromine in the foamable polystyrene resin particles;

A represents a % by mass of the flame retardant contained in the total foamable polystyrene resin particles, B represents a % by mass of the flame retardant contained in the surface of the resin particles, and a ratio of B:A is in a range of from 0.8:1 to 1.2:1 when A is defined as 1, an amount of the flame retardant added is in a range of from 0.5% by mass to 5.0% by mass, based on 100 parts by mass of a total polymer fraction in the foamable polystyrene resin particles, and the foamable polystyrene resin particles further comprise a carbon material selected from the group consisting of a conductive carbon black and graphite, and a content of the carbon material is 0.5 to 25 parts by mass with respect to 100 parts by mass of the resin particle, and wherein the foamable polystyrene resin particles for producing a vehicle interior material are obtained by a melt extrusion method in which foamable polystyrene resin particles are obtained by adding the flame retardant and the foaming agent to the polystyrene resin and kneading this mixture in a resin supply to obtain a molten resin mixture device, extruding the molten resin mixture containing the flame retardant and the foaming agent directly into a cooling liquid from small holes of a die that is attached to a leading end of the resin supply device thereby forming an extrudate, cutting the extrudate simultaneously with the extrusion, and cooling and solidifying the extrudate by bringing the extrudate into contact with the cooling liquid, and wherein the flame retardant is contained in the foamable polystyrene resin particles in a range satisfying (1) at least 3% by mass based on the mass of the foamable polystyrene resin particles and in a range from 0.5% by mass to 5.0% by mass based on 100 parts by mass of a total polymer fraction in the foamable polystyrene resin particles, and (2) $Y > 1.0 \, \text{Ln}(X) - 1.5$, wherein Y represents the content of the bromine-based flame retardant in terms of % by mass based on the mass of the foamable polystyrene resin particles, and X represents a value obtained by multiplying the specific surface area ($m^2/g$) of the carbon material by the content of the carbon material in terms of % by mass based on the mass of the foamable polystyrene resin particles.

9. The foamable polystyrene resin particles according to claim 8, wherein the total amount of contained aromatic organic compounds is less than 500 ppm.

10. The foamable polystyrene resin particles according to claim 8,
wherein the flame retardant is at least one selected from the group consisting of tetrabromobisphenol A and a derivative thereof.

11. The foamable polystyrene resin particles according to claim 10, wherein the flame retardant is at least one selected from the group consisting of tetrabromobisphenol A-bis(2,3-dibromo-2-methylpropyl ether), tetrabromobisphenol A-bis(2,3-dibromopropyl ether), and tetrabromobisphenol A-bis(allyl ether).

12. Prefoamed particles for producing a vehicle interior material that are obtained by heating the foamable polystyrene resin particles according to claim 8.

13. The prefoamed particles according to claim 12, which contain bubbles of 0.2 to 1 mm and bubbles of 0.15 mm or less.

14. The prefoamed particles according to claim 13, wherein the bubbles of 0.15 mm or less have an occupation ratio of 10% to 90% per cross-sectional area of the polystyrene resin prefoamed particles.

15. The foamable polystyrene resin particles according to claim 9,
wherein the aromatic organic compounds include a styrene-based monomer, ethylbenzene, isopropylbenzene, normalpropylbenzene, xylene, toluene and benzene.

* * * * *